US009618425B2

United States Patent
Clark et al.

(10) Patent No.: US 9,618,425 B2
(45) Date of Patent: Apr. 11, 2017

(54) SYSTEM AND METHOD FOR DETERMINING UNIFORMITY OF A TIRE

(71) Applicant: Android Industries LLC, Auburn Hills, MI (US)

(72) Inventors: Barry Allan Clark, Ortonville, MI (US); Donald G. Straitiff, Howell, MI (US); Robert Reece, Clarkston, MI (US)

(73) Assignee: Android Industries LLC, Auburn Hills, MI (US)

( * ) Notice: Subject to any disclaimer, the term of this patent is extended or adjusted under 35 U.S.C. 154(b) by 429 days.

(21) Appl. No.: 14/080,146

(22) Filed: Nov. 14, 2013

(65) Prior Publication Data

US 2014/0132740 A1    May 15, 2014

Related U.S. Application Data

(60) Provisional application No. 61/726,862, filed on Nov. 15, 2012.

(51) Int. Cl.
*G01M 17/02* (2006.01)
*G01B 11/245* (2006.01)

(52) U.S. Cl.
CPC ........... *G01M 17/02* (2013.01); *G01B 11/245* (2013.01); *G01M 17/027* (2013.01)

(58) Field of Classification Search
CPC .................................................. G01M 17/027
USPC .................................................... 348/48, 149
See application file for complete search history.

(56) References Cited

U.S. PATENT DOCUMENTS

| 5,616,839 A | 4/1997 | Chen et al. | |
| 7,177,740 B1 * | 2/2007 | Guangjun | G01M 17/027 356/139.09 |
| 2001/0052259 A1 * | 12/2001 | Mahner | G01M 17/027 73/146 |
| 2002/0050317 A1 * | 5/2002 | Iwasaki | B60C 3/00 156/123 |
| 2003/0076414 A1 * | 4/2003 | Sato | G01S 11/12 348/148 |
| 2005/0081614 A1 | 4/2005 | Zhu | |

(Continued)

FOREIGN PATENT DOCUMENTS

| JP | 2008185511 A | 8/2008 | |
| JP | WO 2012101993 A1 * | 8/2012 | B60C 11/00 |

OTHER PUBLICATIONS

"JP 2008-185511 Translation". Aug. 2008.*

(Continued)

*Primary Examiner* — Zhihan Zhou
(74) *Attorney, Agent, or Firm* — Honigman Miller Schwartz and Cohn LLP

(57) ABSTRACT

A system for determining road force uniformity of a tire is disclosed. The system includes a plurality of imaging devices and a computer communicatively-coupled to the plurality of imaging devices. The plurality of imaging devices images a plurality of surfaces of the tire as the tire-wheel assembly is rotated about an axis of rotation. The computer receives images captured by the plurality of imaging devices in order for the computer to extract data from the images such that the computer may execute a road force uniformity simulation algorithm for the purpose of algorithmically simulating road force uniformity of the tire.

17 Claims, 17 Drawing Sheets

(56) References Cited

U.S. PATENT DOCUMENTS

| | | | | |
|---|---|---|---|---|
| 2005/0120787 | A1* | 6/2005 | Thiesen | B60C 11/24 73/146.5 |
| 2006/0083347 | A1* | 4/2006 | Nosekabel | G01M 17/027 378/61 |
| 2009/0040533 | A1 | 2/2009 | Takahashi et al. | |
| 2010/0296738 | A1* | 11/2010 | Sukegawa | G01B 11/24 382/199 |
| 2011/0102811 | A1* | 5/2011 | Kaneko | G01B 11/0608 356/625 |
| 2011/0288814 | A1* | 11/2011 | Mizutani | G01B 11/2522 702/150 |
| 2012/0007956 | A1* | 1/2012 | Joly | G01M 17/027 348/47 |
| 2012/0242824 | A1* | 9/2012 | Takahashi | G01B 11/0608 348/86 |
| 2013/0103374 | A1* | 4/2013 | Sotgiu | G06G 7/70 703/8 |
| 2013/0276949 | A1* | 10/2013 | Yano | B60C 11/00 152/530 |

OTHER PUBLICATIONS

International Search Report & Written Oppinion for Application No. PCT/US2013/070040 dated Feb. 26, 2014.
Supplementary EP Search Report of Application EP 13855002.5 dated Jun. 15, 2016.
Canadian Office Action dated Jun. 16, 2016 for Application No. 2889896.
JP-to-English Machine Translation of JP2008-185511A (11 pages).
JP Office Action for Application JP2015-542767 dated Jun. 8, 2016.

\* cited by examiner

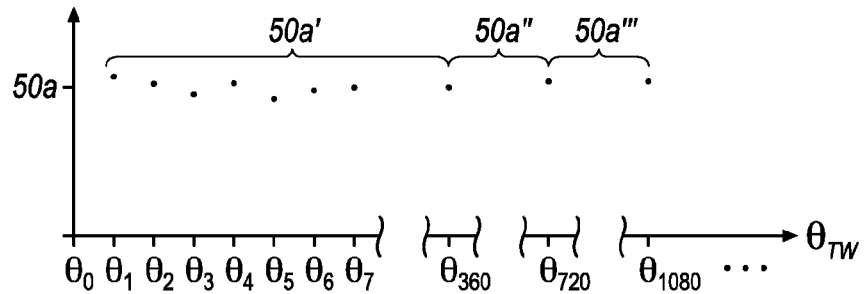
FIG. 4A
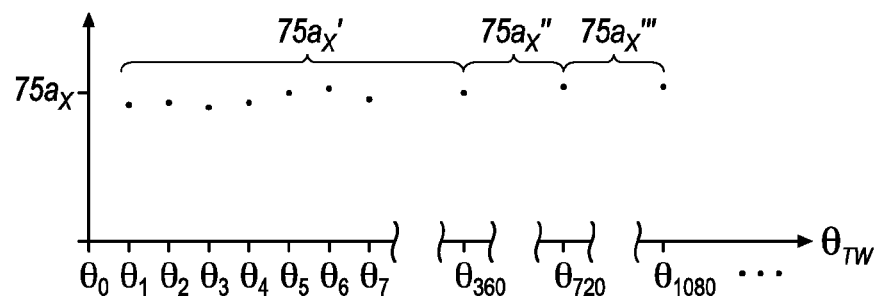
FIG. 5A$_X$
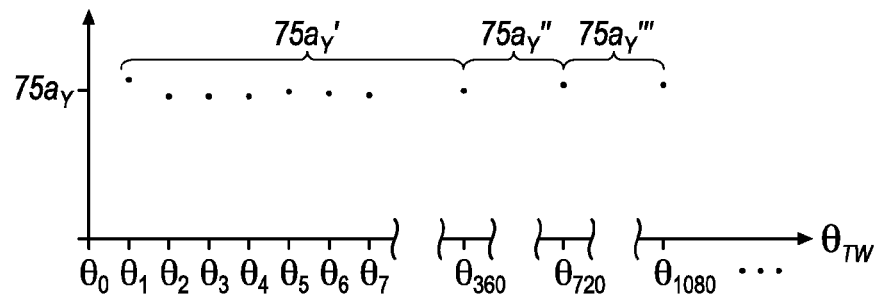
FIG. 5A$_Y$

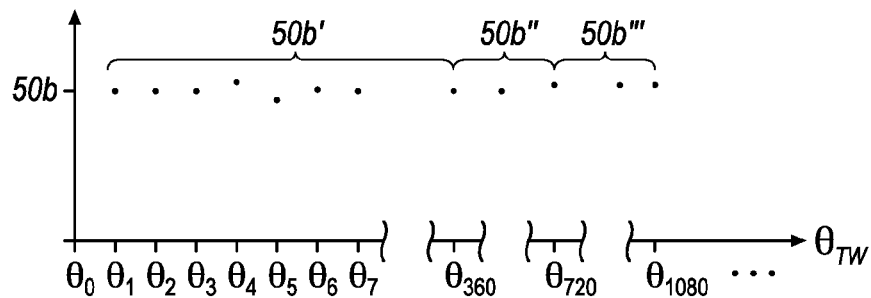
FIG. 4B
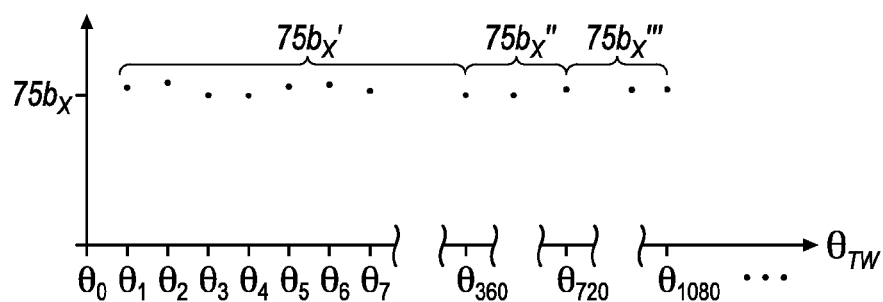
FIG. 5B$_X$
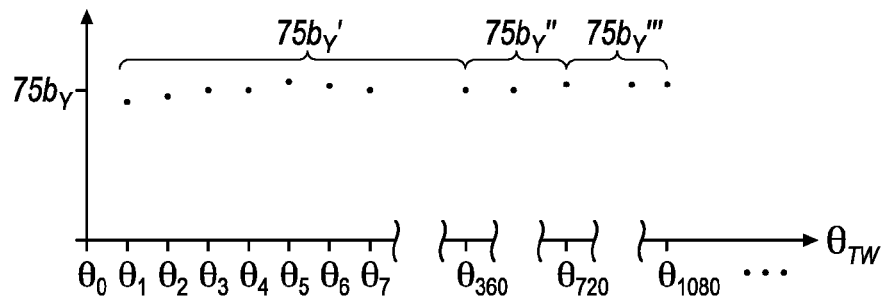
FIG. 5B$_Y$
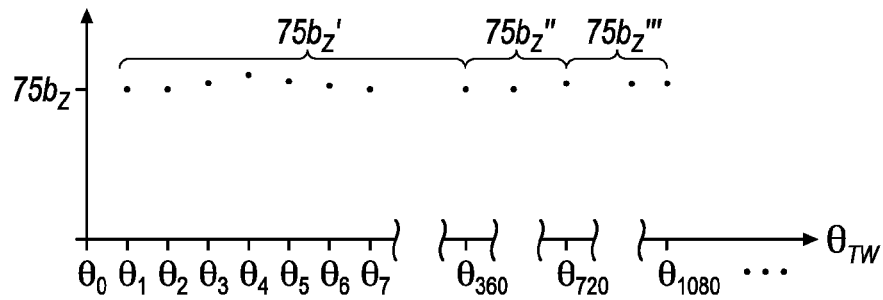
FIG. 5B$_Z$

SYSTEM AND METHOD FOR DETERMINING UNIFORMITY OF A TIRE

CROSS-REFERENCE TO RELATED APPLICATIONS

This U.S. patent application claims priority to U.S. Provisional Application 61/726,862 filed on Nov. 15, 2012, the disclosure of which is considered part of the disclosure of this application and is hereby incorporated by reference in its entirety.

FIELD OF THE INVENTION

The disclosure relates to a system and method for determining uniformity of a tire.

DESCRIPTION OF THE RELATED ART

It is known in the art to assemble a tire-wheel assembly in several steps. Usually, conventional methodologies that conduct such steps require a significant capital investment and human oversight. The present invention overcomes drawbacks associated with the prior art by setting forth a simple system and method for assembling a tire-wheel assembly.

BRIEF DESCRIPTION OF THE DRAWINGS

The disclosure will now be described, by way of example, with reference to the accompanying drawings, in which:

FIG. 4A illustrates a plurality of area measurements arising from the two-dimensional analysis of the system of FIG. 2A.

Figure 2A:
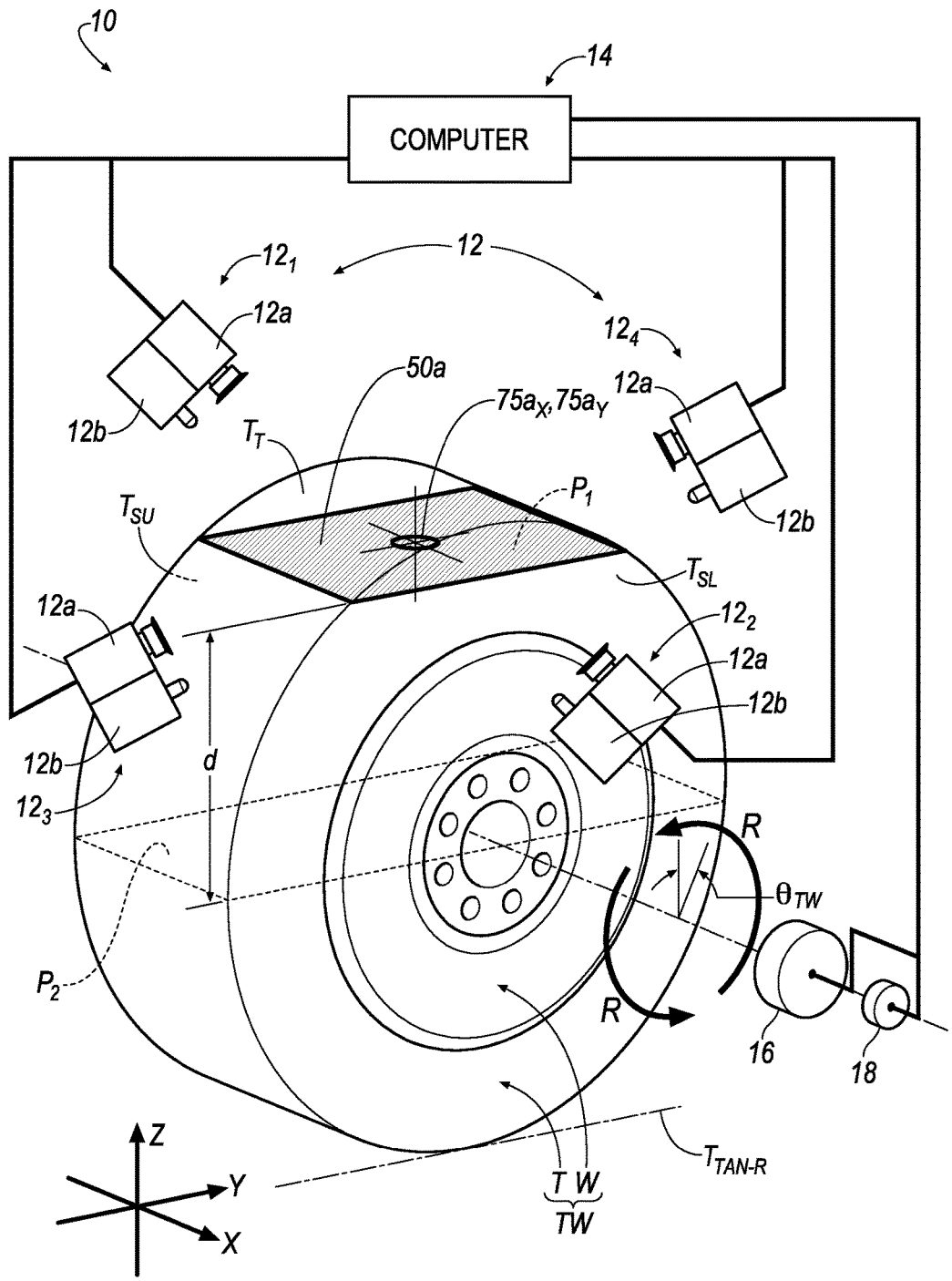
FIG. 2A is a view of the system of FIG. 1 conducting a two-dimensional analysis of the tire that are based upon topographical images of surfaces of the tire.

FIG. $5A_X$ illustrates a plurality of X component centroid area measurements arising from the two-dimensional analysis of the system of FIG. 2A.

FIG. $5A_Y$ illustrates a plurality of Y component centroid area measurements arising from the two-dimensional analysis of the system of FIG. 2A.

Figure 2B:
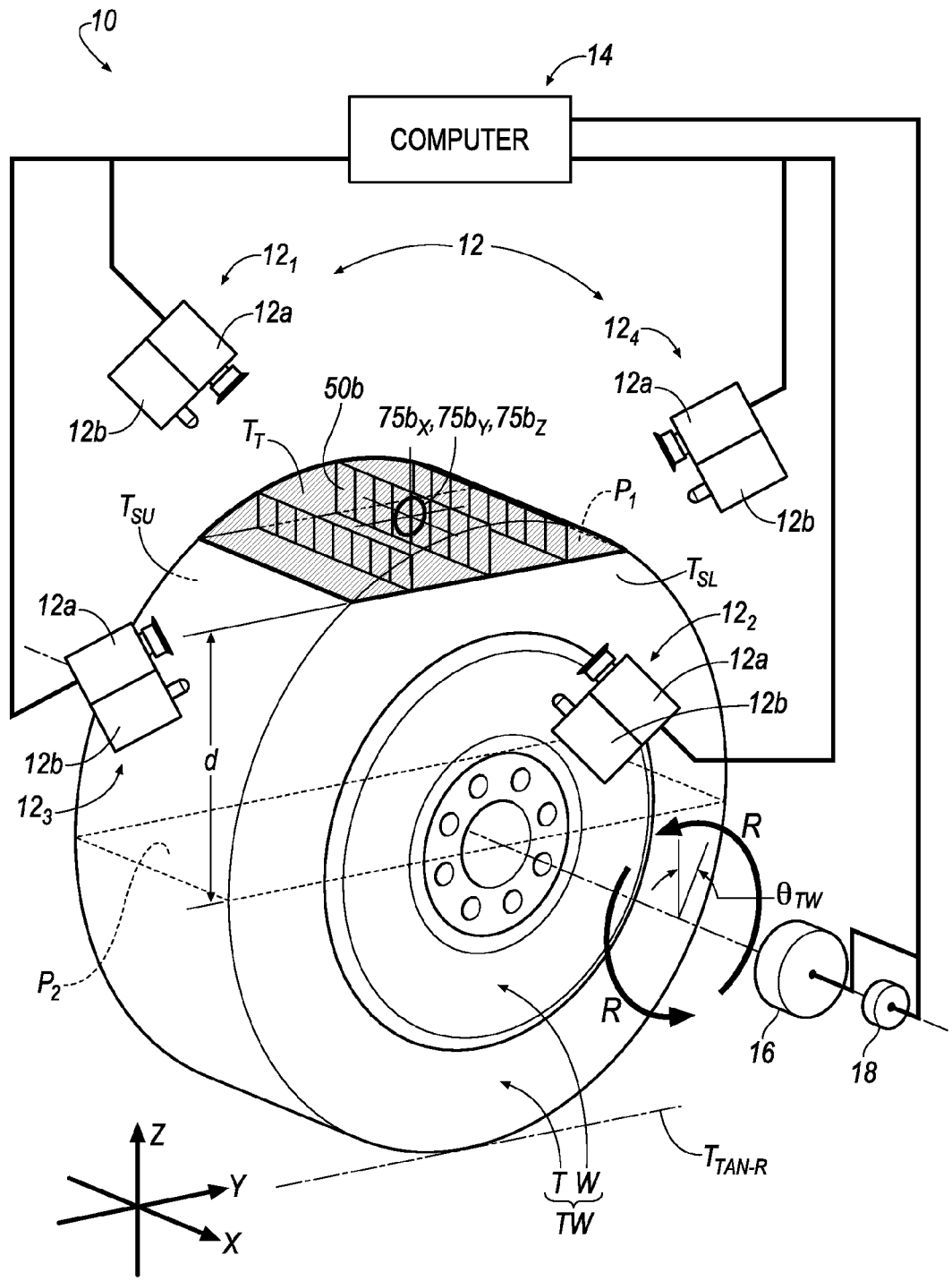
FIG. 2B is a view of the system of FIG. 1 conducting a three-dimensional analysis of the tire that are based upon topographical images of surfaces of the tire.
Figure 3:
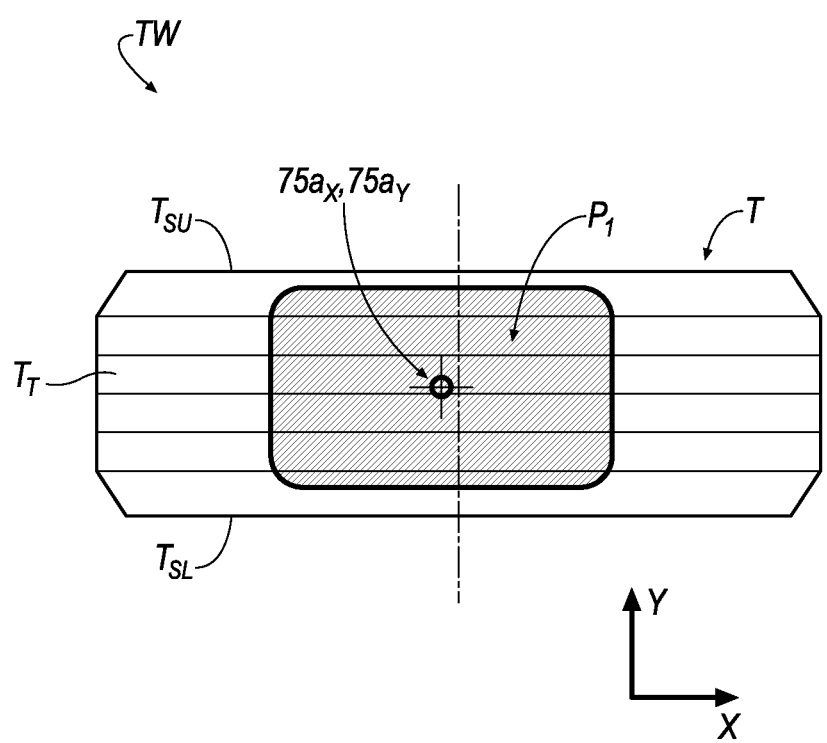
FIG. 3 is a top view of a tire of FIGS. 2A and 2B illustrating a tread surface of the tire.

FIG. 4B illustrates a plurality of volume measurements arising from the three-dimensional analysis of the system of FIG. 2B.

FIG. $5B_X$ illustrates a plurality of X component centroid volume measurements arising from the three-dimensional analysis of the system of FIG. 2B.

FIG. $5B_Y$ illustrates a plurality of Y component centroid volume measurements arising from the three-dimensional analysis of the system of FIG. 2B.

FIG. $5B_Z$ illustrates a plurality of Z component centroid volume measurements arising from the three-dimensional analysis of the system of FIG. 2B.

Figure 6A:
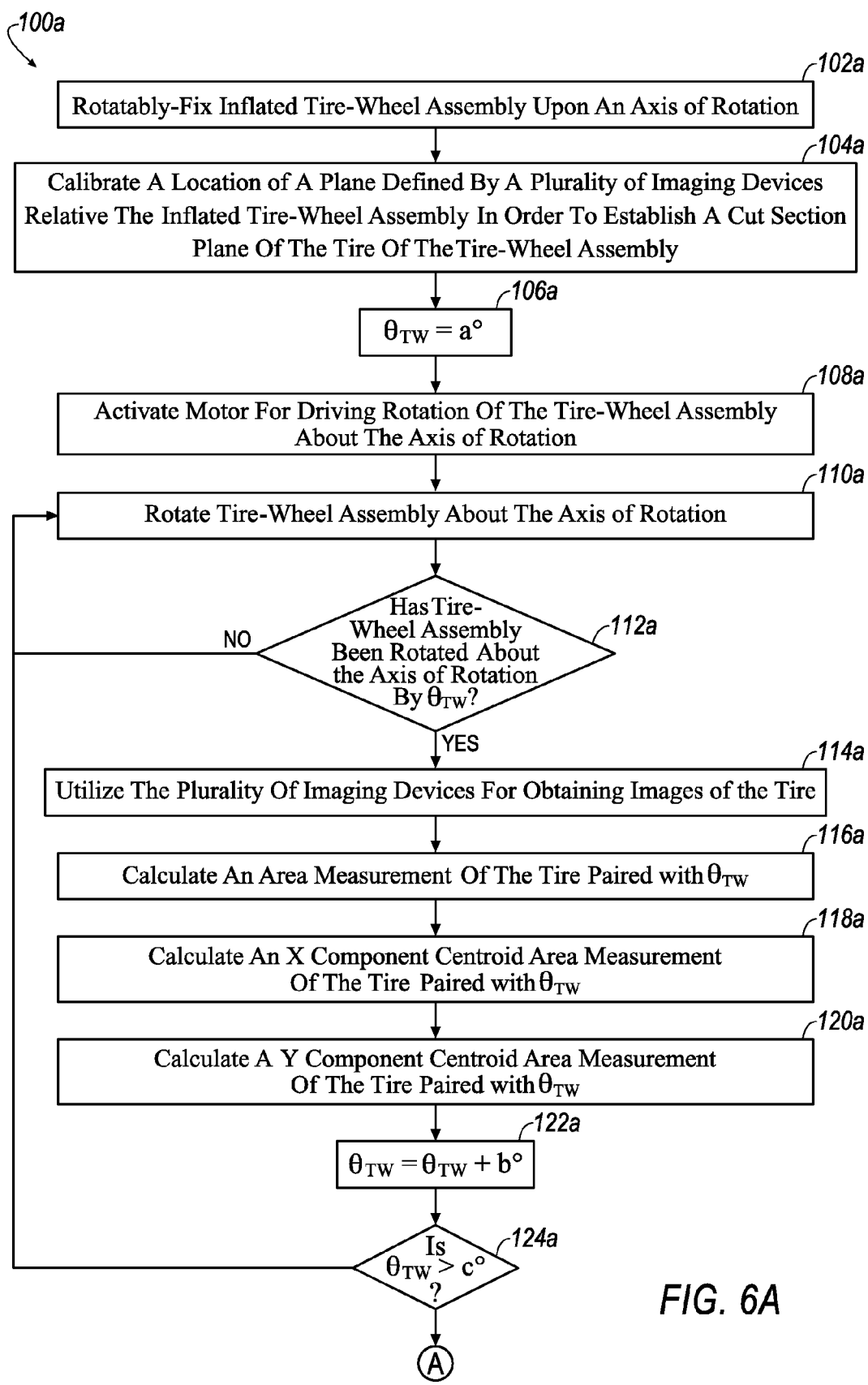

FIG. 6A illustrates a method for determining uniformity of a tire by employing a two-dimensional analysis associated with the system of FIG. 2A.

Figure 6B:
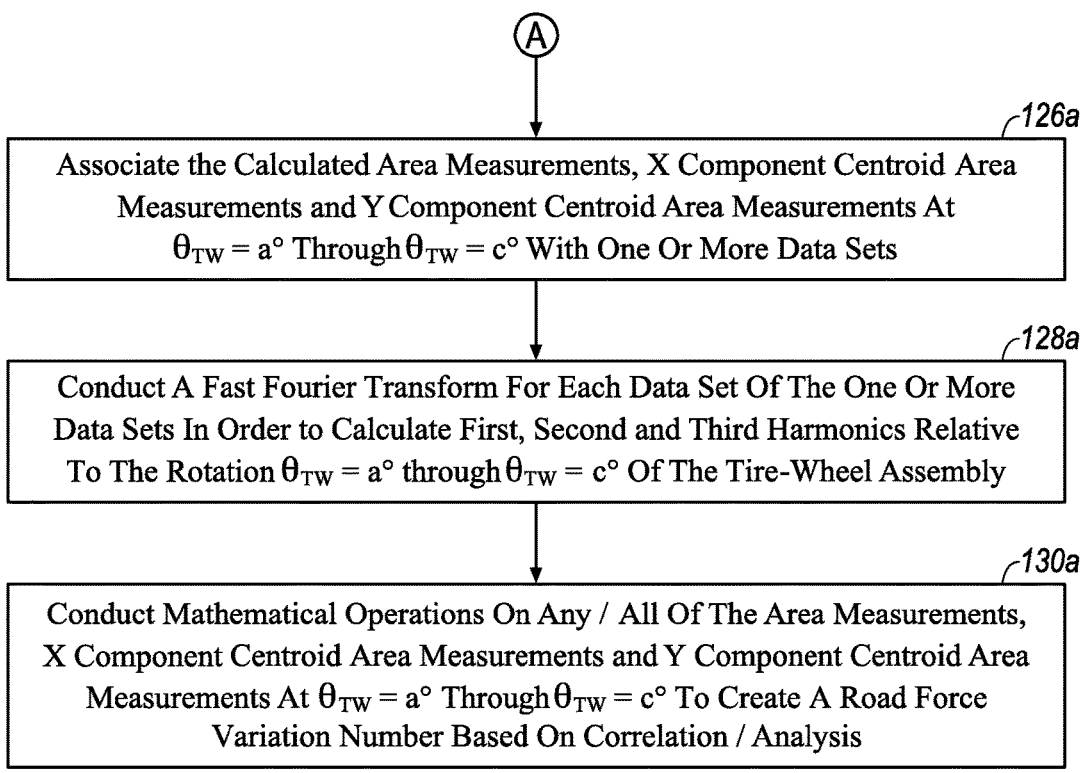

FIG. 6B illustrates a method for determining uniformity of a tire by employing a three-dimensional analysis associated with the system of FIG. 2B.

Figure 6C:
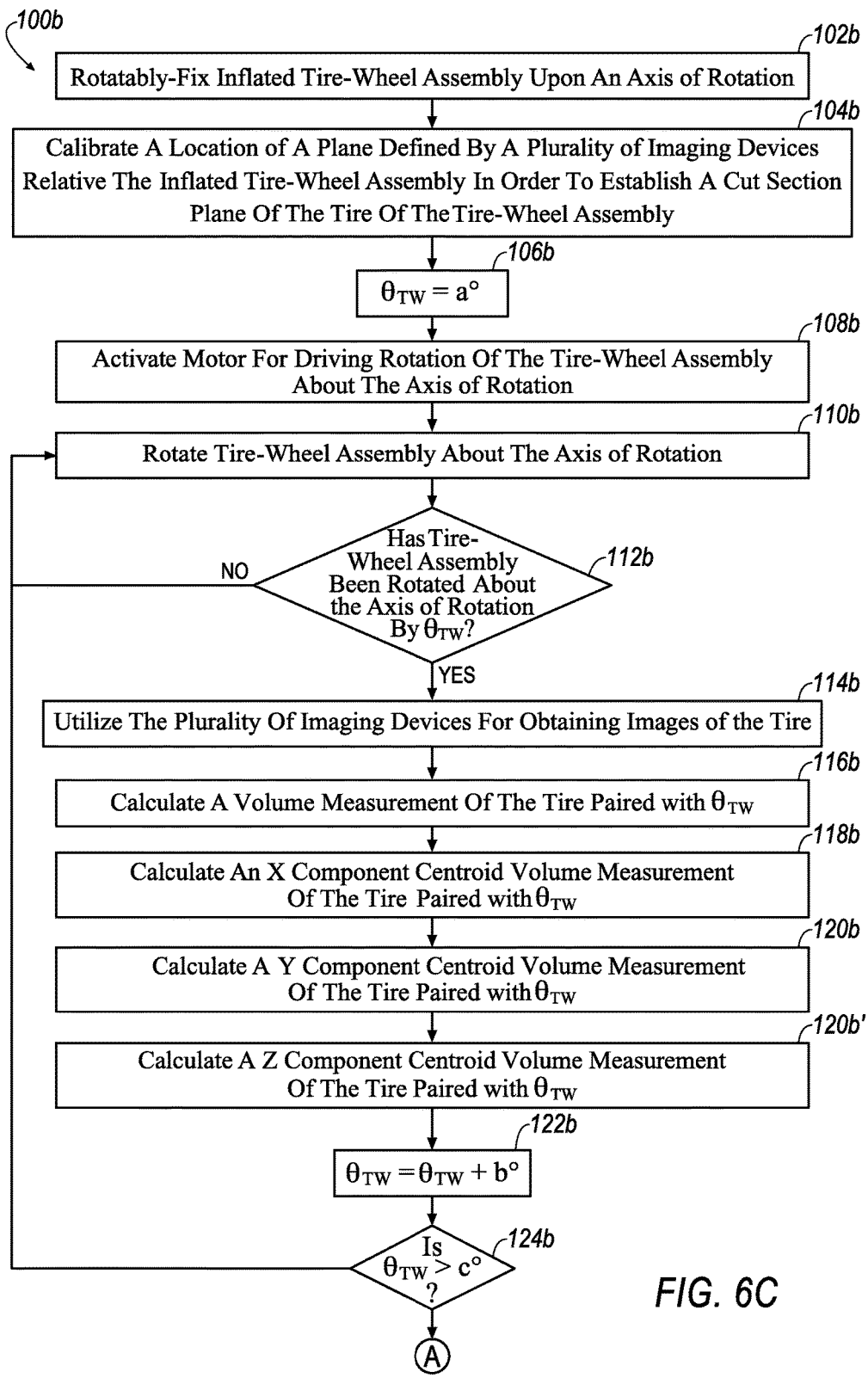

FIG. 6C illustrates a method for determining uniformity of a tire by employing a two-dimensional analysis associated with the system of FIG. 2A.

Figure 6D:
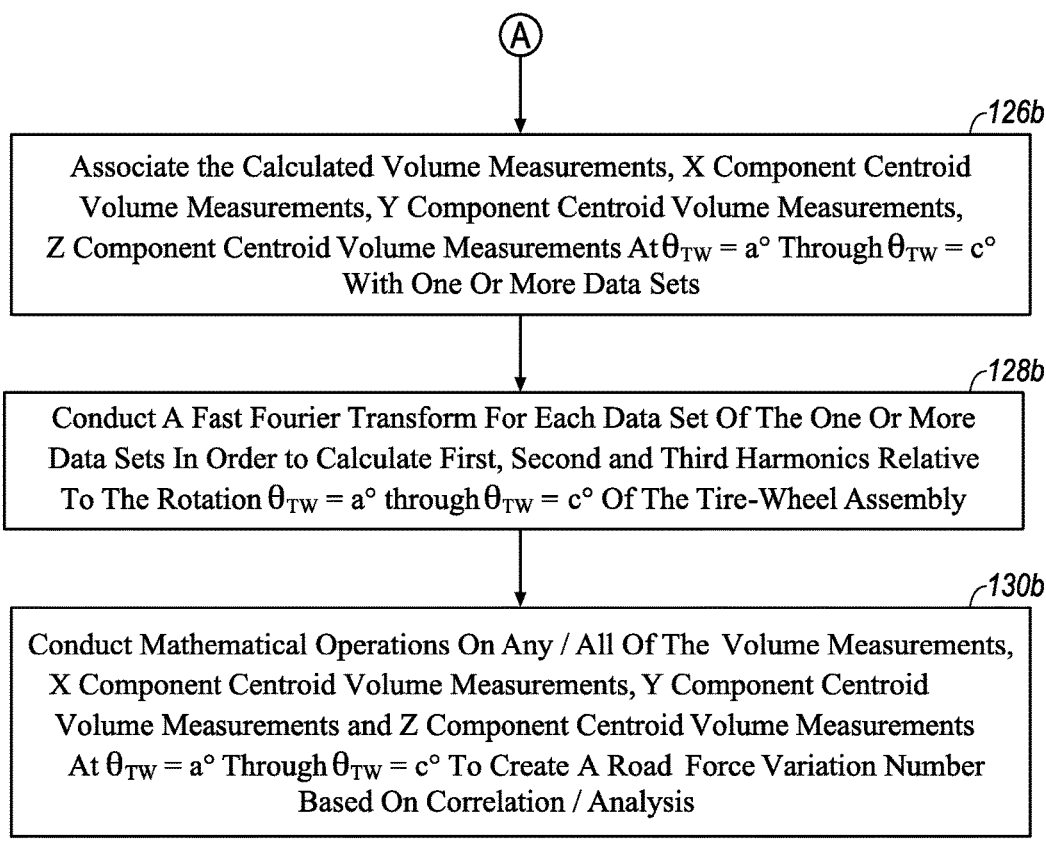

FIG. 6D illustrates a method for determining uniformity of a tire by employing a three-dimensional analysis associated with the system of FIG. 2B.

Figure 6E:
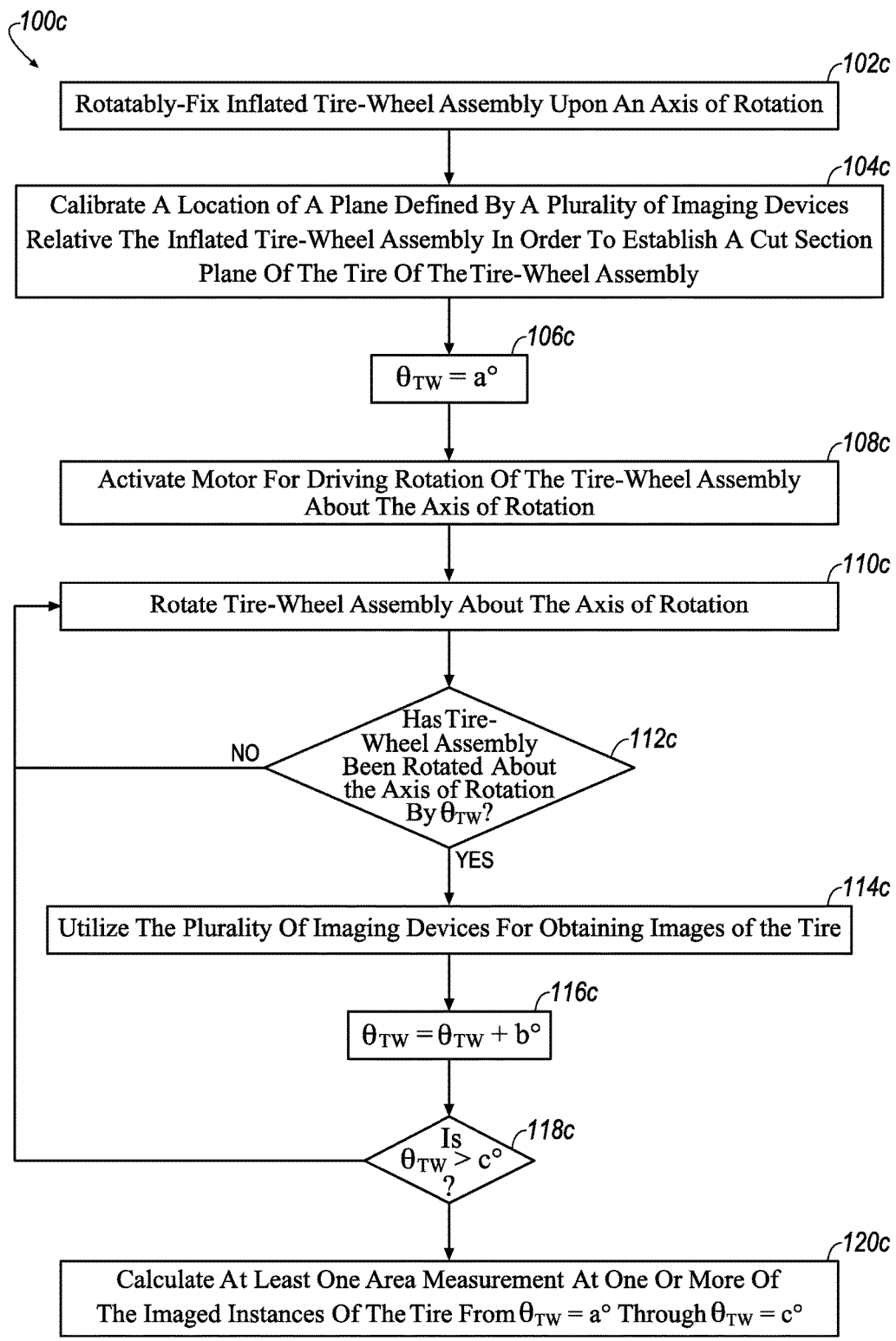

FIG. 6E illustrates a method for determining uniformity of a tire by employing either of the two-dimensional analysis associated with the system of FIG. 2A or the three-dimensional analysis associated with the system of FIG. 2B.

Figure 6F:
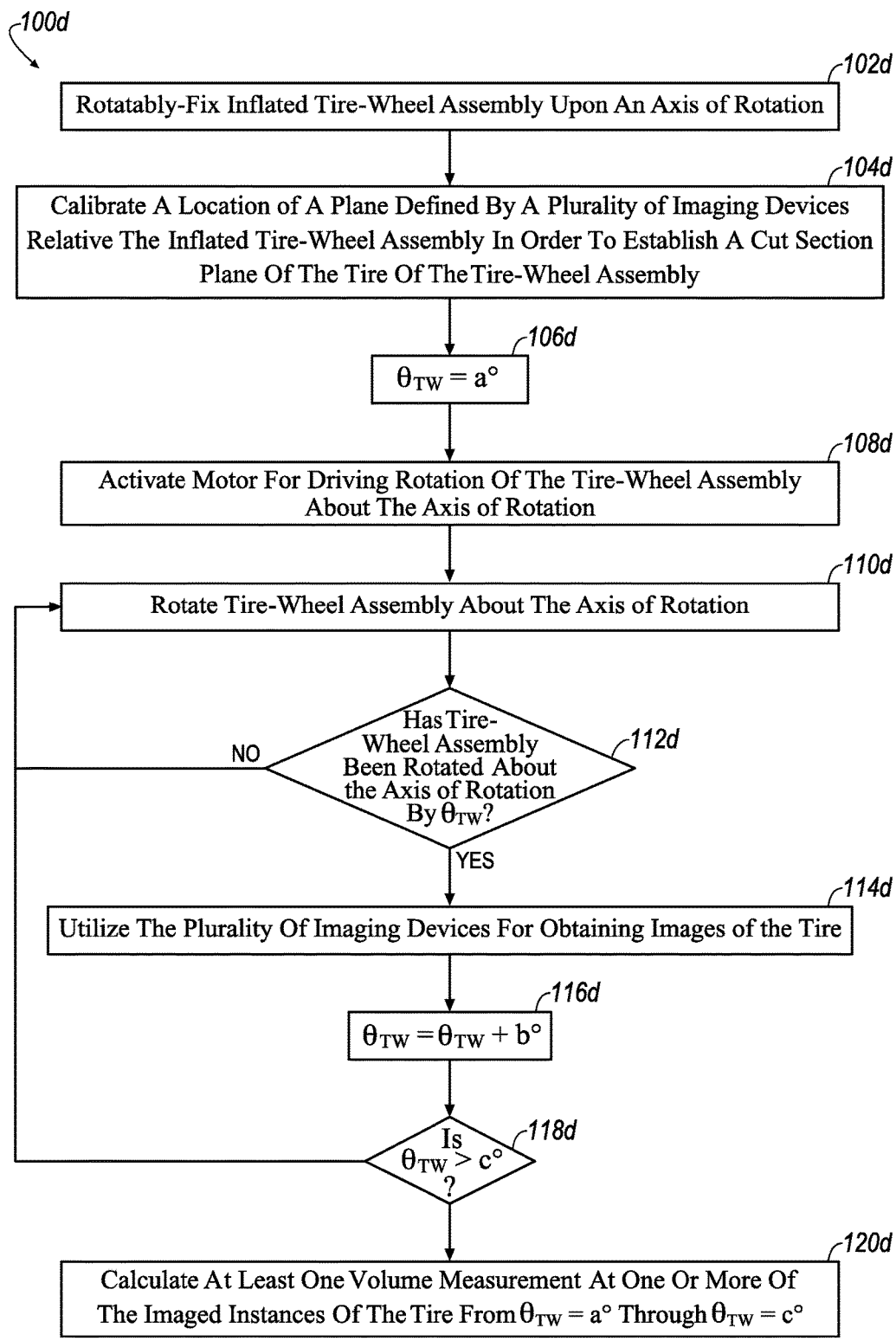

FIG. 6F illustrates a method for determining uniformity of a tire by employing either of the two-dimensional analysis associated with the system of FIG. 2A or the three-dimensional analysis associated with the system of FIG. 2B.

Figure 6G:
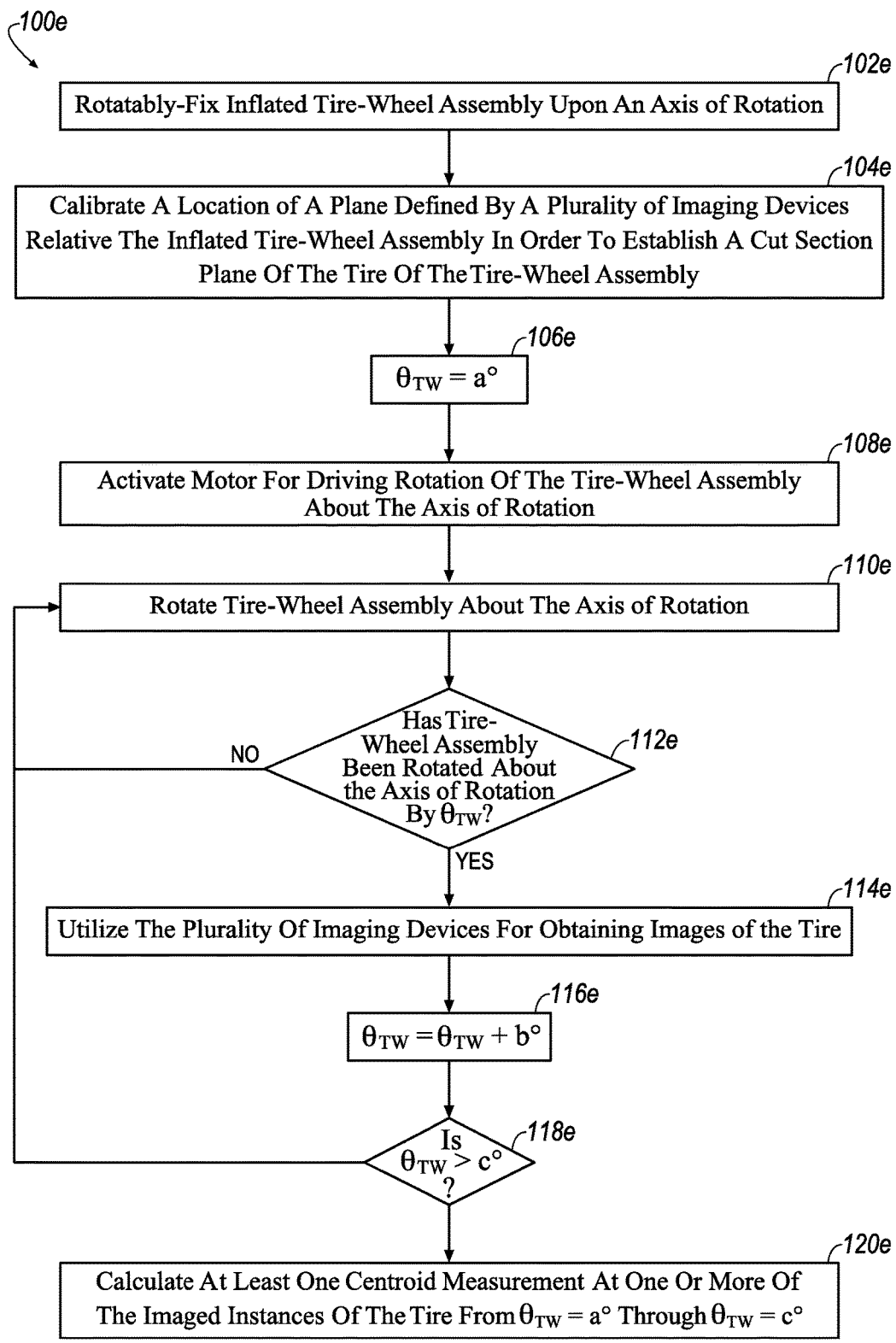

FIG. 6G illustrates a method for determining uniformity of a tire by employing either of the two-dimensional analysis associated with the system of FIG. 2A or the three-dimensional analysis associated with the system of FIG. 2B.

Figure 7A:
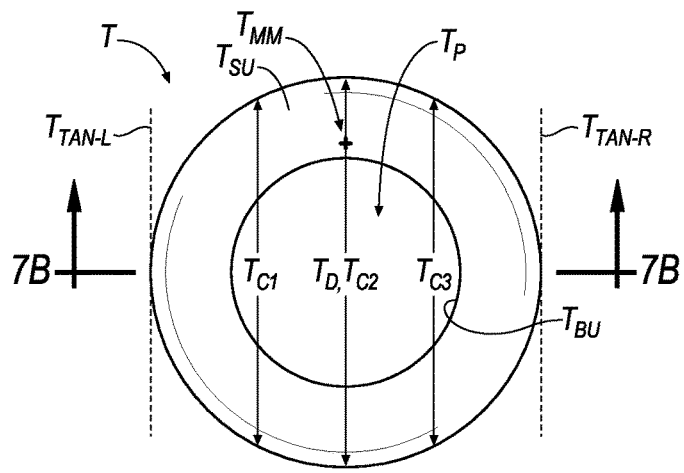

FIG. 7A is a top view of an exemplary tire.

Figure 7B:
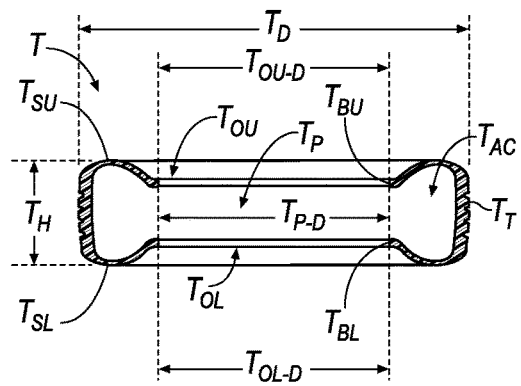

FIG. 7B is a cross-sectional view of the tire according to line 7B-7B of FIG. 7A.

Figure 7C:
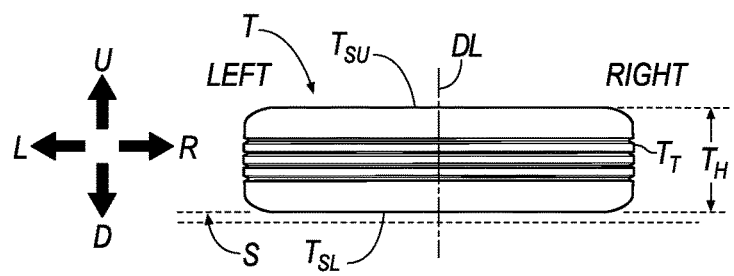

FIG. 7C is a side view of the tire of FIG. 7A.

Figure 7D:
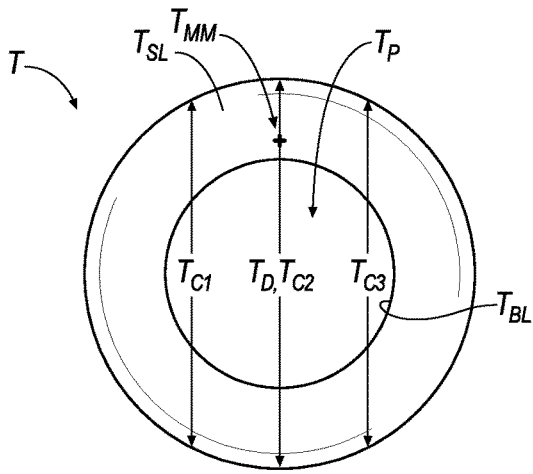

FIG. 7D is a bottom view of the tire of FIG. 7A.

Figure 8A:
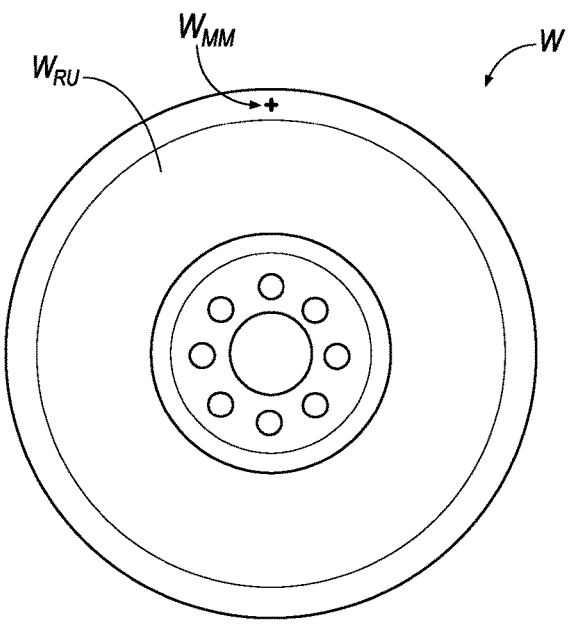

FIG. 8A is a top view of an exemplary wheel.

Figure 8B:
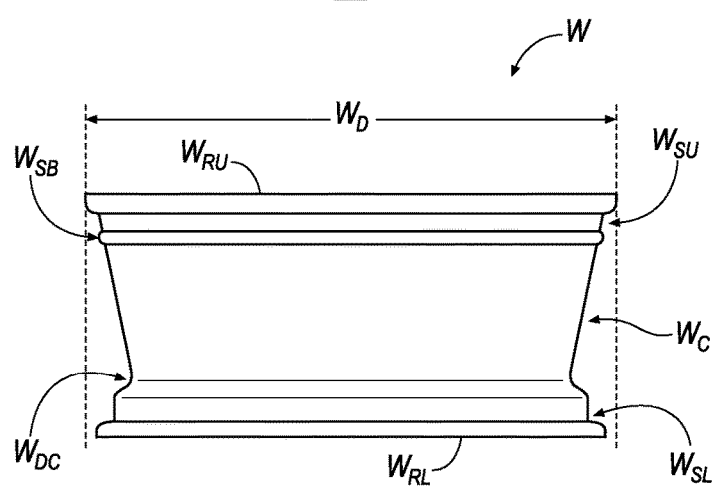

FIG. 8B is a side view of the wheel of FIG. 8A.

Figure 9:
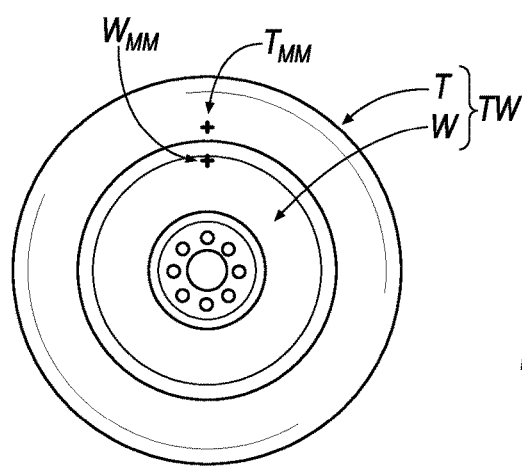

FIG. 9 is a top view of a tire-wheel assembly including the tire of FIG. 7A and the wheel of FIG. 8A.

SUMMARY

One aspect of the disclosure provides a system for determining road force uniformity of a tire including the tire mounted to a wheel and the tire being in an inflated state such that pressurized air is deposited into a circumferential air cavity of the tire which causes an upper bead and a lower bead of the tire to be respectively disposed adjacent and seat in an upper bead seat and a lower bead seat of the wheel. The system includes a plurality of imaging devices and a computer communicatively-coupled to the plurality of imaging devices. The plurality of imaging devices images a plurality of surfaces of the tire as the tire-wheel assembly is rotated about an axis of rotation. The receives images captured by the plurality of imaging devices in order for the computer to extract data from the images such that the computer may execute a road force uniformity simulation algorithm for the purpose of algorithmically simulating road force uniformity of the tire.

In some implementations, the system includes a tire-wheel assembly rotational angular detector. The tire-wheel assembly rotational angular detector is communicatively-coupled to the computer. The computer monitors an angular orientation of the tire of the tire-wheel assembly about the axis of rotation. The computer pairs the angular orientation of the tire with the images of the plurality of surfaces of the tire in order for the computer to identify uniformity or lack thereof of the tire occurring at one or more specific angular orientations of the tire as the tire is rotated about the axis of rotation.

In some examples, the system includes a motor connected to the tire-wheel assembly. The motor is communicatively-coupled to the computer. The computer controls the motor for controlling speed of rotation of the tire-wheel assembly about the axis of rotation.

In some instances, the plurality of surfaces of the tire that are imaged by the plurality of imaging devices includes: an upper sidewall surface of the tire, a lower sidewall surface of the tire, a leading portion of the tread surface of the tire, and a trailing portion of the tread surface of the tire.

In some implementations, the plurality of imaging devices includes: a first imaging device that images the upper sidewall surface of the tire, a second imaging device that images the lower sidewall surface of the tire, a third imaging device that images the leading portion of the tread surface of the tire, and a fourth imaging device that images the trailing portion of the tread surface of the tire.

In some examples, the plurality of imaging devices includes: a camera that images the plurality of surfaces of the tire and an illuminator that directs light toward the plurality of surfaces of the tire.

In some instances, the illuminator is a laser.

In some implementations, the plurality of imaging devices are aligned with an offset plane. The offset plane is arranged at a distance from a reference plane. The reference plane traverses the axis of rotation and is parallel to a tangent line extending across the tread surface of the tire.

In some examples, the offset plane does not traverse the axis of rotation and is parallel to both of the reference plane and the tangent line extending across the tread surface of the tire.

In some instances, the plurality of imaging devices are connected to a carrier. The carrier is selectively-arranged relative the tire for selectively-adjusting the location of the offset plane, and, correspondingly, the plurality of imaging devices relative the tire.

In some examples, the computer utilizes the data for algorithmically creating at least one virtual cut section through the tire along the offset plane.

In some instances, the at least one virtual cut section through the tire includes a plurality of virtual cut sections through the tire at different instances of time over a period of time defined by a revolution of the tire-wheel assembly.

In some implementations, the revolution of the tire-wheel assembly includes a full 360° revolution of the tire-wheel assembly.

In some examples, the computer algorithmically identifies uniformity or lack thereof of the tire by conducting at least one two-dimensional calculation gleaned from at least one topographical image of the plurality of surfaces of the tire from each imaging device of the plurality of imaging devices that are derived from an X-component and a Y-component of each virtual cut section through the tire of the plurality of virtual cut sections through the tire.

In some instances, the at least one two-dimensional calculation includes at least one area measurement of the tire.

In some implementations, the at least one area measurement of the tire includes a plurality of area measurements of the tire. Each area measurement of the plurality of area measurements of the tire is paired with an angular orientation of the tire over at least one full revolution of the tire-wheel assembly in order for the computer to compile at least one set of area measurements of the tire from the plurality of area measurements of the tire.

In some examples, the at least one two-dimensional calculation includes at least one X-component centroid area measurement of the tire and at least one Y-component centroid area measurement of the tire.

In some instances, the at least one X-component centroid area measurement of the tire includes a plurality of X-component centroid area measurements of the tire. The at least one Y-component centroid area measurement of the tire includes a plurality of Y-component centroid area measurements of the tire. Each X-component centroid area measurement of the tire of the plurality of X-component centroid area measurements of the tire is paired with an angular orientation of the tire over at least one full revolution of the tire-wheel assembly in order for the computer to compile at least one set of X-component centroid area measurements of the tire. Each Y-component centroid area measurement of the tire of the plurality of Y-component centroid area measurements of the tire is paired with the angular orientation of the tire over at least one full revolution of the tire-wheel assembly in order for the computer to compile at least one set of Y-component centroid area measurement of the tire.

In some implementations, the computer algorithmically identifies uniformity or lack thereof of the tire by conducting at least one three-dimensional calculation gleaned from at least one topographical image of the plurality of surfaces of the tire from each imaging device of the plurality of imaging devices that are derived from an X-component, a Y-component and a Z-component of each virtual cut section through the tire of the plurality of virtual cut sections through the tire.

In some examples, the at least one three-dimensional calculation includes at least one volume measurement of the tire.

In some instances, the at least one volume measurement of the tire includes a plurality of volume measurements of the tire. Each volume measurement of the plurality of volume measurements of the tire is paired with an angular orientation of the tire over at least one full revolution of the tire-wheel assembly in order for the computer to compile at least one set of volume measurements of the tire from the plurality of volume measurements of the tire.

In some implementations, the at least one three-dimensional calculation includes: at least one X-component centroid volume measurement of the tire, at least one Y-component centroid volume measurement of the tire, and at least one Z-component centroid volume measurement of the tire.

In some examples, the at least one X-component centroid volume measurement of the tire includes a plurality of X-component centroid volume measurements of the tire. Each X-component centroid volume measurement of the tire of the plurality of X-component centroid volume measurements of the tire is paired with an angular orientation of the tire over at least one full revolution of the tire-wheel assembly in order for the computer to compile at least one set of X-component centroid volume measurements of the tire. The at least one Y-component centroid volume measurement of the tire includes a plurality of Y-component centroid volume measurements of the tire. Each Y-component centroid volume measurement of the tire of the plurality of Y-component centroid volume measurements of the tire is paired with an angular orientation of the tire over at least one full revolution of the tire-wheel assembly in order for the computer to compile at least one set of Y-component centroid volume measurement of the tire. The at least one Z-component centroid volume measurement of the tire includes a plurality of Z-component centroid volume measurements of the tire. Each Z-component centroid volume measurement of the tire of the plurality of Z-component centroid volume measurements of the tire is paired with an angular orientation of the tire over at least one full revolution of the tire-wheel assembly in order for the computer to compile at least one set of Z-component centroid volume measurement of the tire.

Another aspect of the disclosure provides a method for analyzing a tire-wheel assembly including a tire mounted to a wheel with the tire being in an inflated state such that pressurized air is deposited into a circumferential air cavity of the tire which causes an upper bead and a lower bead of the tire to be respectively disposed adjacent and seat in an upper bead seat and a lower bead seat of the wheel. The method includes the step of: utilizing a system for determining road force uniformity of a tire. The system includes a plurality of imaging devices that are communicatively-coupled to a computer. The method includes the steps of: rotating the tire-wheel assembly about an axis of rotation; utilizing the plurality of imaging devices for imaging a plurality of surfaces of the tire as the tire-wheel assembly is rotated about an axis of rotation; utilizing the computer for receiving images captured by the plurality of imaging devices in order for the computer; and extracting data from the images for executing a road force uniformity simulation algorithm for algorithmically simulating road force uniformity of the tire.

In some implementations, the system includes a tire-wheel assembly rotational angular detector that is communicatively-coupled to the computer (14). The method further includes the steps of: utilizing the assembly rotational angular detector for sending a signal to the computer that is related to angular orientation of the tire arising from the step of rotating the tire-wheel assembly about an axis of rotation; and receiving the signal at the computer for monitoring the angular orientation of the tire.

In some examples, the method further includes the step of: utilizing the computer for pairing the angular orientation of the tire with captured images of the plurality of surfaces of the tire for permitting the computer to algorithmically identify uniformity or lack thereof of the tire occurring at one or more specific angular orientations of the tire as the tire is rotated about the axis of rotation.

In some instances, the system includes a motor connected to the tire-wheel assembly. The motor is communicatively-coupled to the computer. The method further includes the step of: utilizing the computer for sending a signal to the motor for controlling speed of the rotation of the tire-wheel assembly about the axis of rotation.

In some implementations, the plurality of surfaces of the tire that are imaged by the plurality of imaging devices includes: an upper sidewall surface of the tire, a lower sidewall surface of the tire, a leading portion of the tread surface of the tire, and a trailing portion of the tread surface of the tire.

In some examples, the plurality of imaging devices includes: a first imaging device for imaging the upper sidewall surface of the tire, a second imaging device for imaging the lower sidewall surface of the tire, a third imaging device for imaging the leading portion of the tread surface of the tire, and a fourth imaging device for imaging the trailing portion of the tread surface of the tire.

In some instances, the plurality of imaging devices includes: a camera for imaging the plurality of surfaces of the tire and an illuminator for directing light toward the plurality of surfaces of the tire.

In some implementations, the illuminator is a laser.

In some examples, the method includes the step of: aligning the plurality of imaging devices with an offset plane. The offset plane is arranged at a distance from a reference plane. The reference plane traverses the axis of rotation and is parallel to a tangent line extending across the tread surface of the tire.

In some instances, the offset plane does not traverse the axis of rotation and is parallel to both of the reference plane and the tangent line extending across the tread surface of the tire.

In some implementations, the plurality of imaging devices are connected to a carrier. The method includes the step of: selectively-arranging the carrier relative the tire for selectively-adjusting the location of the offset plane, and, correspondingly, the plurality of imaging devices relative the tire.

In some examples, the method includes the step of: utilizing the data for algorithmically creating at least one virtual cut section through the tire along the offset plane.

In some instances, the at least one virtual cut section through the tire includes a plurality of virtual cut sections through the tire at different instances of time over a period of time defined by a revolution of the tire-wheel assembly.

In some implementations, the revolution of the tire-wheel assembly includes a full 360° revolution of the tire-wheel assembly.

In some examples, the method includes the step of: utilizing the computer for algorithmically identifying uniformity or lack thereof of the tire by conducting at least one two-dimensional calculation gleaned from at least one topographical image of the plurality of surfaces of the tire from each imaging device of the plurality of imaging devices that are derived from an X-component and a Y-component of each virtual cut section through the tire of the plurality of virtual cut sections through the tire.

In some instances, the at least one two-dimensional calculation includes at least one area measurement of the tire.

In some implementations, the at least one area measurement of the tire includes a plurality of area measurements of the tire. The method includes the step of: utilizing the computer for pairing each area measurement of the plurality of area measurements of the tire with an angular orientation of the tire over at least one full revolution of the tire-wheel assembly for compiling at least one set of area measurements of the tire from the plurality of area measurements of the tire.

In some examples, the at least one two-dimensional calculation includes at least one X-component centroid area measurement of the tire and at least one Y-component centroid area measurement of the tire.

In some instances, the at least one X-component centroid area measurement of the tire includes a plurality of X-component centroid area measurements of the tire. The at least one Y-component centroid area measurement of the tire includes a plurality of Y-component centroid area measurements of the tire. The method includes the steps of: utilizing the computer for pairing each X-component centroid area measurement of the tire of the plurality of X-component centroid area measurements of the tire with an angular orientation of the tire over at least one full revolution of the tire-wheel assembly for compiling at least one set of X-component centroid area measurements of the tire; and utilizing the computer for pairing each Y-component centroid area measurement of the tire of the plurality of Y-component centroid area measurements of the tire with the angular orientation of the tire over at least one full revolution of the tire-wheel assembly for compiling at least one set of Y-component centroid area measurement of the tire.

In some implementations, the method includes the step of: utilizing the computer for algorithmically identifying uniformity or lack thereof of the tire by conducting at least one three-dimensional calculation gleaned from at least one topographical image of the plurality of surfaces of the tire from each imaging device of the plurality of imaging devices that are derived from an X-component, a Y-component and a Z-component of each virtual cut section through the tire of the plurality of virtual cut sections through the tire.

In some examples, the at least one three-dimensional calculation includes at least one volume measurement of the tire.

In some instances, the at least one volume measurement of the tire includes a plurality of volume measurements of the tire. The method includes the step of: utilizing the computer for pairing each volume measurement of the plurality of volume measurements of the tire with an angular orientation of the tire over at least one full revolution of the tire-wheel assembly for compiling at least one set of volume measurements of the tire from the plurality of volume measurements of the tire.

In some implementations, the at least one three-dimensional calculation includes: at least one X-component centroid volume measurement of the tire, at least one Y-component centroid volume measurement of the tire, and at least one Z-component centroid volume measurement of the tire.

In some examples, the at least one X-component centroid volume measurement of the tire includes a plurality of X-component centroid volume measurements of the tire. The at least one Y-component centroid volume measurement of the tire includes a plurality of Y-component centroid volume measurements of the tire. The at least one Z-component centroid volume measurement of the tire includes a plurality of Z-component centroid volume measurements of the tire. The method includes the steps of: utilizing the computer for pairing each X-component centroid volume measurement of the tire of the plurality of X-component centroid volume measurements of the tire with an angular orientation of the tire over at least one full revolution of the tire-wheel assembly for compiling at least one set of X-component centroid volume measurements of the tire; utilizing the computer for pairing each Y-component centroid volume measurement of the tire of the plurality of Y-component centroid volume measurements of the tire with an angular orientation of the tire over at least one full revolution of the tire-wheel assembly for compiling at least one set of Y-component centroid volume measurement of the tire; utilizing the computer for pairing each Z-component centroid volume measurement of the tire of the plurality of Z-component centroid volume measurements of the tire with an angular orientation of the tire over at least one full revolution of the tire-wheel assembly for compiling at least one set of Z-component centroid volume measurement of the tire.

The details of one or more implementations of the disclosure are set forth in the accompanying drawings and the description below. Other aspects, features, and advantages will be apparent from the description and drawings, and from the claims.

DETAILED DESCRIPTION OF THE INVENTION

The Figures illustrate exemplary embodiments of a system and method for determining uniformity of a tire. Based on the foregoing, it is to be generally understood that the nomenclature used herein is simply for convenience and the terms used to describe the invention should be given the broadest meaning by one of ordinary skill in the art.

Prior to describing embodiments of the invention, reference is made to FIGS. 7A-7D, which illustrate an exemplary tire, T. Further, in describing embodiments of the invention in the present disclosure, reference may be made to the "upper," "lower," "left," "right" and "side" of the tire, T; although such nomenclature may be utilized to describe a particular portion or aspect of the tire, T, such nomenclature may be adopted due to the orientation of the tire, T, with respect to structure that supports/engages the tire, T. Accordingly, the above nomenclature should not be utilized to limit the scope of the claimed invention and is utilized herein for exemplary purposes in describing an embodiment of the invention.

In an embodiment, the tire, T, includes an upper sidewall surface, $T_{SU}$ (see, e.g., FIG. 7A), a lower sidewall surface, $T_{SL}$ (see, e.g., FIG. 7D), and a tread surface, $T_T$ (see, e.g., FIGS. 7B-7C), that joins the upper sidewall surface, $T_{SU}$, to the lower sidewall surface, $T_{SL}$. Referring to FIG. 7B, the upper sidewall surface, $T_{SU}$, may rise away from the tread surface, $T_T$, to a peak and subsequently descend at a slope to terminate at and form a circumferential upper bead, $T_{BU}$; similarly, the lower sidewall surface, $T_{SL}$, may rise away from the tread surface, $T_T$, to a peak and subsequently descend at a slope to terminate at and form a circumferential lower bead, $T_{BL}$. The tread surface, $T_T$, may also define a height, $T_H$, of the tire, T, that extends between the upper sidewall surface, $T_{SU}$, and the lower sidewall surface, $T_{SL}$.

As seen in FIG. 7B, when the tire, T, is in a relaxed, unbiased state, the upper bead, $T_{BU}$, forms a circular, upper tire opening, $T_{OU}$; similarly, when the tire, T, is in a relaxed, unbiased state, the lower bead, $T_{BL}$, forms a circular, lower tire opening, $T_{OL}$. It will be appreciated that when an external force is applied to the tire, T, the tire, T, may be physically manipulated, and, as a result, one or more of the upper tire opening, $T_{OU}$, and the lower tire opening, $T_{OL}$, may be temporality upset such that one or more of the upper tire opening, $T_{OU}$, and the lower tire opening, $T_{OL}$, is/are not entirely circular, but, may, for example, be manipulated to include a non-circular shape, such as, for example, an oval shape.

Referring to FIG. 7B, when in the relaxed, unbiased state, each of the upper tire opening, $T_{OU}$, and the lower tire opening, $T_{OL}$, form, respectively, an upper tire opening diameter, $T_{OU\text{-}D}$, and a lower tire opening diameter, $T_{OL\text{-}D}$. Further, as seen in FIGS. 7A-7B, when in the relaxed, unbiased state, the upper sidewall surface, $T_{SU}$, and the lower sidewall surface, $T_{SL}$, define the tire, T, to include a tire diameter, $T_D$.

Referring to FIGS. 7A-7B and 7D, the tire, T, also includes a passage, $T_P$. Access to the passage, $T_P$, is permitted by either of the upper tire opening, $T_{OU}$, and the lower tire opening, $T_{OL}$. Referring to FIG. 7B, when the tire, T, is in a relaxed, unbiased state, the upper tire opening, $T_{OU}$, and the lower tire opening, $T_{OL}$, define the passage, $T_P$, to include a diameter, $T_{P\text{-}D}$. Referring also to FIG. 7B, the tire, T, includes a circumferential air cavity, $T_{AC}$, that is in communication with the passage, $T_P$. After joining the tire, T, to a wheel, W, pressurized air is deposited into the circumferential air cavity, $T_{AC}$, for inflating the tire, T.

Further, when the tire, T, is arranged adjacent structure or a wheel, W (see, e.g., FIGS. 8A-8B), as described in the following disclosure, the written description may reference a "left" portion or a "right" portion of the tire, T. Referring to FIG. 7C, the tire, T, is shown relative to a support member, S; the support member, S, is provided (and shown in phantom) in order to establish a frame of reference for the "left" portion and the "right" portion of the tire, T. In FIG. 7C, the tire, T, is arranged in a "non-rolling" orientation such that the tread surface, $T_T$, is not disposed adjacent the phantom support member, S, but, rather the lower sidewall surface, $T_{SL}$, is disposed adjacent the phantom support member, S. A center dividing line, DL, equally divides the "non-rolling" orientation of the tire, T, in half in order to generally indicate a "left" portion of the tire, T, and a "right" portion of the tire, T.

As discussed above, reference is made to several diameters, $T_{P-D}$, $T_{OU-D}$, $T_{OL-D}$ of the tire, T. According to geometric theory, a diameter passes through the center of a circle, or, in the present disclosure, the axial center of the tire, T, which may alternatively be referred to as an axis of rotation of the tire, T. Geometric theory also includes the concept of a chord, which is a line segment that whose endpoints both lie on the circumference of a circle; according to geometric theory, a diameter is the longest chord of a circle.

In the following description, the tire, T, may be moved relative to structure; accordingly, in some instances, a chord of the tire, T, may be referenced in order to describe an embodiment of the invention. Referring to FIG. 7A, several chords of the tire, T, are shown generally at $T_{C1}$, $T_{C2}$ (i.e., the tire diameter, $T_D$) and $T_{C3}$.

The chord, $T_{C1}$, may be referred to as a "left" tire chord. The chord, $T_{C3}$, may be referred to as a "right" tire chord. The chord, $T_{C2}$, may be equivalent to the tire diameter, $T_D$, and be referred to as a "central" chord. Both of the left and right tire chords, $T_{C1}$, $T_{C3}$, include a geometry that is less than central chord, $T_{C2}$/tire diameter, $T_D$.

In order to reference the location of the left chord, $T_{C1}$, and the right chord, $T_{C3}$, reference is made to a left tire tangent line, $T_{TAN-L}$, and a right tire tangent line, $T_{TAN-R}$. The left chord, $T_{C1}$, is spaced apart approximately one-fourth (¼) of the tire diameter, $T_D$, from the left tire tangent line, $T_{TAN-L}$. The right chord, $T_{C3}$, is spaced apart approximately one-fourth (¼) of the tire diameter, $T_D$, from the right tire tangent line, $T_{TAN-R}$. Each of the left and right tire chords, $T_{C1}$, $T_{C3}$, may be spaced apart about one-fourth (¼) of the tire diameter, $T_D$, from the central chord, $T_{C2}$. The above spacings referenced from the tire diameter, $T_D$, are exemplary and should not be meant to limit the scope of the invention to approximately a one-fourth (¼) ratio; accordingly, other ratios may be defined, as desired.

Further, as will be described in the following disclosure, the tire, T, may be moved relative to structure. Referring to FIG. 7C, the movement may be referenced by an arrow, U, to indicate upwardly movement or an arrow, D, to indicate downwardly movement. Further, the movement may be referenced by an arrow, L, to indicate left or rearwardly movement or an arrow, R, to indicate right or forwardly movement.

Prior to describing embodiments of the invention, reference is made to FIGS. 8A-8B, which illustrate an exemplary wheel, W. Further, in describing embodiments of the invention in the present disclosure, reference may be made to the "upper," "lower," "left," "right" and "side" of the wheel, W; although such nomenclature may be utilized to describe a particular portion or aspect of the wheel, W, such nomenclature may be adopted due to the orientation of the wheel, W, with respect to structure that supports/engages the wheel, W. Accordingly, the above nomenclature should not be utilized to limit the scope of the claimed invention and is utilized herein for exemplary purposes in describing an embodiment of the invention.

In an embodiment, the wheel, W, includes an upper rim surface, $W_{RU}$, a lower rim surface, $W_{RL}$, and an outer circumferential surface, $W_C$, that joins the upper rim surface, $W_{RU}$, to the lower rim surface, $W_{RL}$. Referring to FIG. 8B, upper rim surface, $W_{RU}$, forms a wheel diameter, $W_D$. The wheel diameter, $W_D$, may be non-constant about the circumference, $W_C$, from the upper rim surface, $W_{RU}$, to the lower rim surface, $W_{RL}$. The wheel diameter, $W_D$, formed by the upper rim surface, $W_{RU}$, may be largest diameter of the non-constant diameter about the circumference, $W_C$, from the upper rim surface, $W_{RU}$, to the lower rim surface, $W_{RL}$. The wheel diameter, $W_D$, is approximately the same as, but slightly greater than the diameter, $T_{P-D}$, of the passage, $T_P$, of the tire, T; accordingly, once the wheel, W, is disposed within the passage, $T_P$, the tire, T, may flex and be frictionally-secured to the wheel, W, as a result of the wheel diameter, $W_D$, being approximately the same as, but slightly greater than the diameter, $T_{P-D}$, of the passage, $T_P$, of the tire, T.

The outer circumferential surface, $W_C$, of the wheel, W, further includes an upper bead seat, $W_{SU}$, and a lower bead seat, $W_{SL}$. The upper bead seat, $W_{SU}$, forms a circumferential cusp, corner or recess that is located proximate the upper rim surface, $W_{RU}$. The lower bead seat, $W_{SL}$, forms a circumferential cusp, corner or recess that is located proximate the lower rim surface, $W_{RL}$. Upon inflating the tire, T, the pressurized air causes the upper bead, $T_{BU}$, to be disposed adjacent and "seat" in the upper bead seat, $W_{SU}$; similarly, upon inflating the tire, T, the pressurized air causes the lower bead, $T_{BL}$, to be disposed adjacent and "seat" in the lower bead seat, $W_{SL}$. In some circumstances, after inflation of the tire, T, entrapments, such as, for example, contaminants, lubricant or the like, may be trapped between the bead, $T_{BU}$/$T_{BL}$, of the tire, T, and the bead seat $W_{SU}$/$W_{SL}$ of the wheel, W; the entrapments may be removed after the inflated tire-wheel assembly, TW, is subjected to a bead exerciser.

The non-constant diameter of the outer circumference, $W_C$, of the wheel, W, further forms a wheel "drop center," $W_{DC}$. A wheel drop center, $W_{DC}$, may include the smallest diameter of the non-constant diameter of the outer circumference, $W_C$, of the wheel, W. Functionally, the wheel drop center, $W_{DC}$, may assist in the mounting of the tire, T, to the wheel, W.

The non-constant diameter of the outer circumference, $W_C$, of the wheel, W, further forms an upper "safety bead," $W_{SB}$. In an embodiment, the upper safety bead may be located proximate the upper bead seat, $W_{SU}$. In the event that pressurized air in the circumferential air cavity, $T_{AC}$, of the tire, T, escapes to atmosphere, the upper bead, $T_{BU}$, may "unseat" from the upper bead seat, $W_{SU}$; because of the proximity of the safety bead, $W_{SB}$, the safety bead, $W_{SB}$, may assist in the mitigation of the "unseating" of the upper bead, $T_{BU}$, from the upper bead seat, $W_{SU}$, by assisting in the retaining of the upper bead, $T_{BU}$, in a substantially seated orientation relative to the upper bead seat, $W_{SU}$. In some embodiments, the wheel, W, may include a lower safety bead (not shown); however, upper and/or lower safety beads may be included with the wheel, W, as desired, and are not required in order to practice the invention described in the following disclosure.

With reference now to FIGS. 7A and 8A, physical attributes of the tire, T, and the wheel, W, are described. It should be noted that the discussed physical attributes may be inherent aspects/characteristics of each of the tire, T, and the wheel, W, which may arise from, for example, a manufacturing technique (e.g., molding, casting or the like) of each of the tire, T, and the wheel, W.

As seen in FIG. 7A, the tire, T, may include an inherent physical attribute that is referred to as a "high point of radial force variation" (see $T_{MM}$). When the tire, T, is in use, the high point of radial force variation may be described as a region of the tire, T, where there is a fluctuation in force that appears in the rotating axis of the tire, T, when a specific load is applied, and, when the tire, T, is rotated at a specific speed.

Referring to FIG. 8A, the wheel, W, may include an inherent physical attribute that is referred to as a "point of minimum radial run out" (see $W_{MM}$). To a certain extent, about every wheel, W, may be manufactured with an inherent imperfection (which may arise from, for example, material distribution and/or flow of material during the manufacturing process of the wheel, W). Accordingly, the imperfection of the wheel, W, may result in the wheel, W, being "out-of-round," or, having a "run-out" (i.e., the wheel, W, therefore, may include the aforementioned "point of minimum radial run out").

When the tire, T, and the wheel, W, are joined (i.e., mounted) together as seen in FIG. 9, it may be desirable to align (or match) the high point of radial force variation, $T_{MM}$, of the tire, T, with the point of minimum radial run out, $W_{MM}$, of the wheel, W. The alignment or "matching" described above may, for example, improve stability of a vehicle to which a tire-wheel assembly, TW, is joined to and/or mitigate abnormal tread-wear patterns to the tire, T. The alignment or "matching" of the high point of radial force variation of the tire, T, with the point of minimum radial run out of the wheel, W, may be referred to as a "uniformity method" of "match mounting."

If, however, one or more of the high point of radial force variation, $T_{MM}$, of the tire, T, and the point of minimum radial run out, $W_{MM}$, of the wheel, W, are not determined or identified by, for example, an original equipment supplier, at the time the tire, T, and the wheel, W, are to be joined (i.e., mounted) together, one (e.g., a person or business entity) may have to determine or locate a point of lightest weight (see $T_{MM}$) of the tire, T, and/or a point of heaviest weight (see $W_{MM}$) of the wheel, W; upon determining/locating the above-described lightest/heaviest points, a substantially similar alignment/"matching" is conducted as described above prior to joining (i.e., mounting) the tire, T, and the wheel, W. In some circumstances, if a valve-stem hole (see $W_{MM}$) is provided on the wheel, W, the point of lightest weight of the tire, T, may be aligned with the valve stem hole on the wheel, W (rather than aligning the point of lightest weight of the tire, T, with the point of heaviest weight of the wheel, W). The alignment of the point of lightest weight of the tire, T, with the valve stem hole/point of heaviest weight of the wheel, W, may be referred to as a "weight method" of "match mounting."

For purposes of describing an embodiment of either of the "uniformity method" or the "weight method" of "match mounting," reference is made to FIGS. 7A, 8A and 9 where: 1) a region of the tire, T, is identified by the reference numeral "$T_{MM}$" and 2) a region of the wheel, W, is identified by the reference numeral "$W_{MM}$." The subscript "MM" for each of the reference numerals $T_{MM}$ and $W_{MM}$ may generally stand for "match mark," and, may be utilized in one of the "uniformity method" or "weight method" for "match mounting" the tire, T, and the wheel, W, together to form a "match-mounted" tire-wheel assembly, TW. Accordingly, if a "uniformity method" is employed in the described match mounting embodiment: 1) the reference numeral "$T_{MM}$" may stand for a region of high point of radial force variation of the tire, T, and 2) the reference numeral $W_{MM}$ may stand for a region of point of minimum radial run out of the wheel, W. Alternatively, if a "weight method" is employed in the described match mounting embodiment: 1) the reference numeral "$T_{MM}$" may stand for a point of lightest weight of the tire, T, and 2) the reference numeral $W_{MM}$ may stand for a point of heaviest weight of the wheel, W, or, a location of a valve stem hole of the wheel, W.

In describing one or more of the match mounting embodiments of the invention, the illustrated "dot" or "spot" seen in the Figures that the reference signs, $T_{MM}$, and, $W_{MM}$, point to should not be construed to be limited to a physical/visible/tactile markings on one or more of the tire, T, and the wheel, W. In some conventional match-marking/match-mounting systems/methodologies, the tire, T, and the wheel, W, may include, for example, a physical marking, object or the like, such as, for example, a paint dot, a tag, a sticker, an engraving, an embossment or the like that is applied to or formed in, upon or within a surface or body portion of one or more of a tire, T, and a wheel, W. However, in one or more alternative embodiments of the present invention, match-mounting techniques may not include any kind of or type of a physical/visible/tactile marking applied to either of the tire, T, and the wheel, W; accordingly, one of, or, many benefits realized by the present invention may be that additional material, time or steps associated with the application and/or formation of the physical marking, object or the like upon one or more of the tire, T, and the wheel, W, is obviated, thereby realizing a cost and/or time savings benefit in the assembling of a tire-wheel assembly, TW. If a physical marking, object or the like is not included on either of the tire, T, and the wheel, W, the spatial region of where the physical marking, object or the like may otherwise be located may be initially unknown to a processing apparatus, but, after one or more processing steps, the spatial region of where the physical marking, object or the like would otherwise by located may become known to/detected/learned by, for example, a computer or microprocessor associated with, for example, the apparatus.

Figure 1:
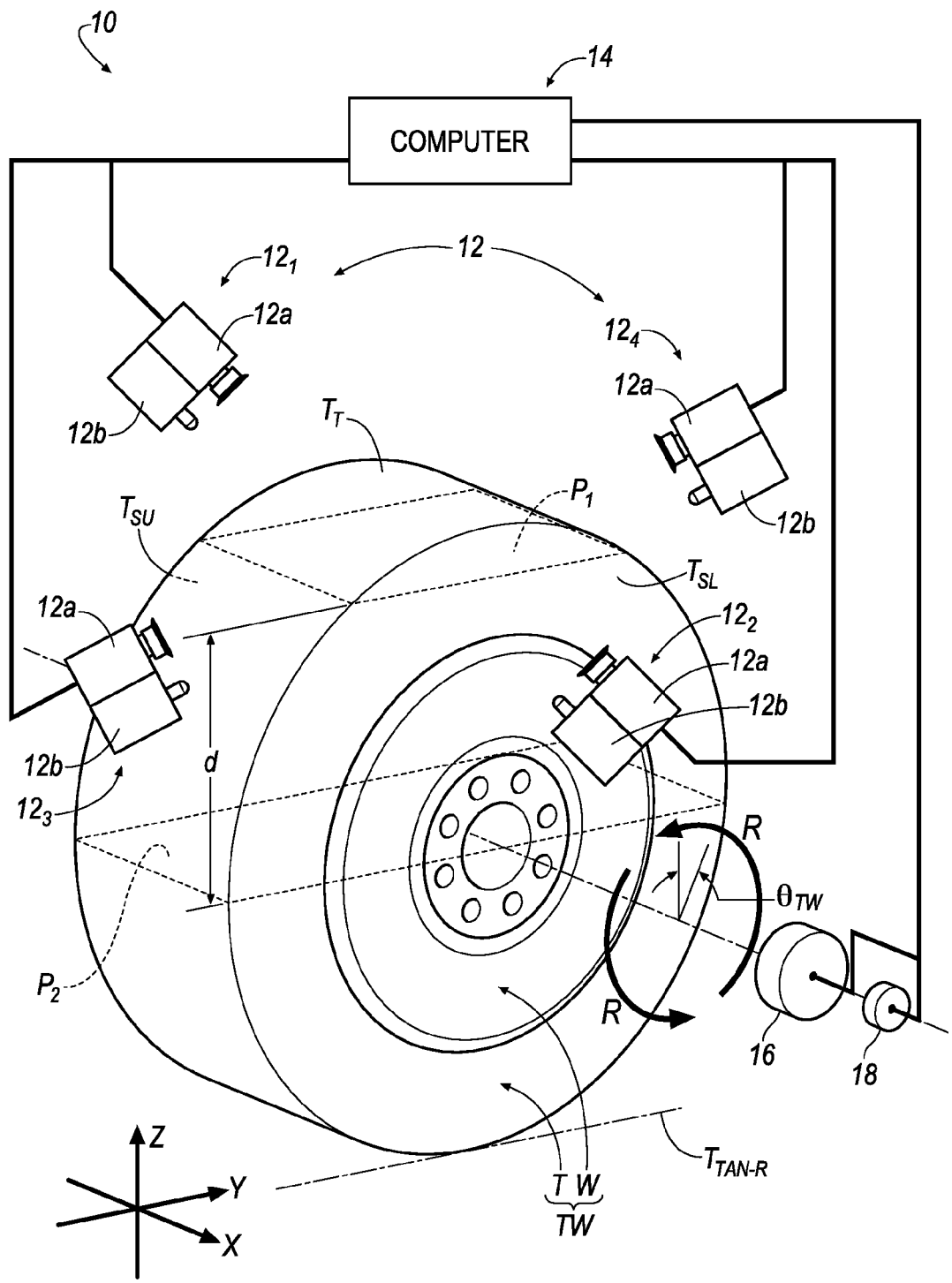
FIG. 1 is a perspective view of a system for determining uniformity of a tire in accordance with an exemplary embodiment of the invention.

Referring to FIG. 1, a non-contact system 10 for determining road force uniformity of a tire, T, is shown according to an embodiment. The tire, T, is shown mounted to the wheel, W, and the tire-wheel assembly, TW, is in an inflated state such that pressurized air is deposited into the circumferential air cavity, $T_{AC}$, of the tire, T, which causes the upper bead, $T_{BU}$, and the lower bead, $T_{BL}$, of the tire, T, to be respectively disposed adjacent and "seat" in the upper bead seat, $W_{SU}$, and the lower bead seat, $W_{SL}$, of the wheel, W. In some instances, the wheel, W, may be a 'test wheel' (e.g., a precision spilt rim) such that the tire, T, is not intended to be attached to the test wheel, W, in an in-use situation. In some situations, non-contact system 10 may include a fixture (e.g., a chuck) includes bead seats that permits receipt of beads of the tire, T, in order to arrange the tire, T, relative the chuck in an inflated orientation (i.e., the non-contact system 10 may operate with other tire mounting structure, such as a chuck, rather than limiting the non-contact system 10 to include a tire, T, that is mounted to a wheel, W, or a test wheel, W). In other examples, the wheel, W, may be a 'use wheel' that is intended to function in concert with the tire, T, as a tire-wheel assembly, TW, that is to be subsequently mounted to a vehicle. Accordingly, the non-contact system 10 of the present invention may be said to determine road force uniformity of a tire, T, alone (if, e.g., the wheel, W, is a 'test wheel'), or, in combination with a wheel, W.

The term "non-contact" as applied to the non-contact system 10 may mean that the system 10 does not include an apparatus, device or component (e.g., a roller) that directly engages and presses into or against the tire, T, for determining road force uniformity of the tire, T. Rather, as will be described in the following disclosure, the system 10 utilizes a plurality of imaging devices 12 that images a plurality of surfaces (e.g., the upper sidewall surface, $T_{SU}$, the lower sidewall surface, $T_{SL}$, the tread surface, $T_T$, or the like) of the tire, T, as the tire-wheel assembly, TW, is being rotated, R, about an axis of rotation, A-A; the images captured by the plurality of imaging devices 12 are then provided to a computer 14 that extracts data from the captured images such that the computer may execute a road force uniformity simulation algorithm for the purpose of algorithmically simulating road force uniformity of the tire, T. Accordingly, the road force uniformity simulation algorithm may determine the road force uniformity of the tire, T, without the tire-wheel assembly, TW, being rotatably-attached to and supporting a vehicle that is arranged upon a support surface (e.g., a roadway).

In addition to the plurality of imaging devices 12 and the computer 14, the system 10 includes a motor 16 and a tire-wheel assembly rotational angular detector 18. Both of the motor 16 and the tire-wheel assembly rotational angular detector 18 are connected to the computer 14.

The computer 14 may be communicatively-coupled to the motor 16 in order to control the rotation, R, of the tire-wheel assembly, TW, about the axis of rotation, A-A. Although shown in abstract form in FIG. 1, the motor 16 may include or be connected to additional structure such as, for example, a shaft (not shown) that extends along the axis of rotation, A-A, and through the wheel, W, for supporting the tire-wheel assembly, TW, about the axis of rotation, A-A.

The tire-wheel assembly rotational angular detector 18 monitors the rotational angular orientation, $\theta_{TW}$, of the tire-wheel assembly, TW, about the axis of rotation, A-A. In some implementations, the tire-wheel assembly rotational angular detector 18 may be communicatively-coupled to both of the motor 16 and the computer 14. The tire-wheel assembly rotational angular detector 18 sends a signal to the computer 14 in order for the computer to pair the angular orientation, $\theta_{TW}$, of the tire-wheel assembly, TW, (and, by default, the angular orientation, $\theta_{TW}$, of the tire, T) with the images captured by the plurality of imaging devices 12. As will be described in the following disclosure, by pairing the angular orientation, $\theta_{TW}$, of the tire-wheel assembly, TW, with the images captured by the plurality of imaging devices 12, the computer 14 may identify uniformity (or lack thereof) of the tire, T, occurring at one or more specific angular orientations, $\theta_{TW}$, of the tire, T, as the tire, T, is rotated, R, about the axis of rotation, A-A.

In some implementations, the plurality of imaging devices 12 of the system 10 may include four imaging device, which are shown generally at $12_1$, $12_2$, $12_3$ and $12_4$. In some instances, each imaging device $12_1$, $12_2$, $12_3$, $12_4$ of the plurality of imaging devices 12 may include a camera 12a and an illuminator/light source 12b. In some examples, the illuminator/light source 12b may include a laser.

The imaging device $12_1$ images a first/upper sidewall surface, $T_{SU}$, of the tire, T. The imaging device $12_2$ images a second/lower sidewall surface, $T_{SL}$, of the tire, T. The imaging device $12_3$ images a leading portion of the tread surface, $T_T$, of the tire, T. The imaging device $12_4$ images a trailing portion of the tread surface, $T_T$, of the tire, T.

The imaging devices $12_1$, $12_2$, $12_3$, $12_4$ may be aligned with an offset plane, $P_1$. The offset plane, $P_1$, is arranged at a distance, d, from a reference plane, $P_2$. The reference plane, $P_2$, traverses the axis of rotation, A-A, and is parallel to a tangent line, $T_{TAN-R}$, extending across the tread surface, $T_T$, of the tire, T. The offset plane, $P_1$, does not traverse the axis of rotation, A-A, and is parallel to both of the reference plane, $P_2$, and the tangent line, $T_{TAN-R}$, extending across the tread surface, $T_T$, of the tire, T.

The location of the offset plane, $P_1$, and, correspondingly, the imaging devices $12_1$, $12_2$, $12_3$, $12_4$ may be selectively adjusted by an operator of the system 10 (e.g., the operator of the system 10 may selectively calibrate the distance, d). In some implementations, the imaging devices $12_1$, $12_2$, $12_3$, $12_4$ may be connected to a common carrier (not shown), and, the imaging devices $12_1$, $12_2$, $12_3$, $12_4$ may be arranged upon the common carrier in a pre-arranged manner such that the imaging devices $12_1$, $12_2$, $12_3$, $12_4$ may be fixed in a common plane (i.e., the offset plane, $P_1$). Therefore, upon adjusting the common carrier relative the tire-wheel assembly, TW, the distance, d, of the common plane ($P_1$) traversing the imaging devices $12_1$, $12_2$, $12_3$, $12_4$ may be arranged closer to or away from (according to the distance, d) the reference plane, $P_2$.

The offset plane, $P_1$, that traverses the tire, T, is representative of the expected deflection of the tire, T, adjacent a support surface (e.g., a roadway) when the tire, T, is subjected to a load imparted by the vehicle; therefore, the offset plane, $P_1$, may be alternatively referred to or construed as a virtual road surface plane. By permitting selective adjustment of the distance, d, the operator of the system 12 may be permitted to tune the uniformity measurement for a particular tire, T, and/or a particular tire-wheel assembly application.

Referring to FIGS. 2A and 2B, the data obtained from the image of each imaging device $12_1$, $12_2$, $12_3$, $12_4$ are collectively utilized in order to algorithmically create a virtual cut section, VC, through the tire, T, along the offset plane, $P_1$. As explained above, the motor 16 rotates, R, the tire-wheel assembly, TW, and, as further explained above, the tire-wheel assembly rotational angular detector 18 sends a signal to the computer 14 for pairing the angular orientation, $\theta_{TW}$, of the tire-wheel assembly, TW, with an image captured by each imaging device $12_1$, $12_2$, $12_3$, $12_4$; therefore, as the tire-wheel assembly, TW, is rotated, R, a plurality of successive virtual cut sections, VC, may be created for a full 360° revolution of the tire-wheel assembly, TW, in order for the computer 14 to algorithmically identify uniformity (or lack thereof) of the tire, T, occurring at one or more specific angular orientations, $\theta_{TW}$, of the tire, T, as the tire, T, is rotated, R, about the axis of rotation, A-A.

The virtual cut sections, VC, may be exploited in at least two different calculation schemes for identify uniformity (or lack thereof) of the tire, T. In an example, referring to FIGS. 2A-6A, the computer 14 algorithmically identifies uniformity (or lack thereof) of the tire, T, by conducting two-dimensional (2D) calculations gleaned from topographical images of the surfaces (e.g., the upper sidewall surface, $T_{SU}$, the lower sidewall surface, $T_{SL}$, the tread surface, $T_T$, or the like) of the tire, T. In another example, referring to FIGS. 2B-6B, the computer 14 algorithmically identifies uniformity (or lack thereof) of the tire, T, by conducting three-dimensional (3D) calculations gleaned from topographical images of the surfaces (e.g., the upper sidewall surface, $T_{SU}$, the lower sidewall surface, $T_{SL}$, the tread surface, $T_T$, or the like) of the tire, T.

Referring to FIG. 2A, the two-dimensional calculations may be derived from an "X component" and a "Y component" of the virtual cut sections, VC. In order to provide a frame of reference of the X and Y components, a three dimensional Cartesian coordinate system (showing X-Y-Z coordinate axes) is represented in the margin of FIG. 2A. In an example, the two-dimensional calculations may include one or more area measurements 50a (that are measured in, for example, cm²) of the tire, T. In another example, as seen in both of FIGS. 2A and 3, the two-dimensional calculations may also include one or more X component centroid area measurements $75a_X$ (that are measured in, for example, mm) and one or more Y component centroid area measurements $75a_Y$ (that are measured in, for example, mm).

Referring to FIG. 4A, a plurality of area measurements 50a are shown according to an embodiment. Each area measurement 50a is paired with angular orientations, $\theta_{TW}$, of the tire, T, as a result of the rotational angular detector 18 sending a signal to the computer 14 as described above. In some examples, the imaging devices $12_1$, $12_2$, $12_3$, $12_4$ may capture images of the tire, T, for each degree of revolution (e.g., $\theta_1$, $\theta_2$, $\theta_3$, etc.) of the tire-wheel assembly, TW, over a full 360° revolution (e.g., $\theta_1$-$\theta_{360}$) of the tire-wheel assembly, TW, in order for the computer 14 to calculate an area measurement 50a for each degree of revolution of the tire-wheel assembly, TW; collectively, the area measurement 50a for each degree of revolution of the tire-wheel assembly, TW, over a full 360° revolution (e.g., $\theta_1$-$\theta_{360}$) of the tire-wheel assembly, TW, may be referred to as a set of area measurements 50a'.

In other instances, the imaging devices $12_1$, $12_2$, $12_3$, $12_4$ may further capture images of the tire, T, for each degree of revolution (e.g., $\theta_{361}$, $\theta_{362}$, $\theta_{363}$, etc.) of the tire-wheel assembly, TW, over another 360° revolution (e.g., $\theta_{361}$-$\theta_{720}$) of the tire-wheel assembly, TW, in order for the computer 14 to calculate a supplemental area measurement 50a for each degree of revolution of the tire-wheel assembly, TW. By capturing one or more sets of supplemental area measurements 50a", 50a'" (at, e.g., $\theta_{361}$-$\theta_{720}$, $\theta_{721}$-$\theta_{1080}$, etc.), the first (baseline) set of area measurements 50a' may be compared to one or more of the one or more sets of supplemental area measurements 50a", 50a'" in order to verify uniformity (or lack thereof) of the tire, T, occurring at one or more specific angular orientations, $\theta_{TW}$, of the tire, T, as the tire, T, is rotated, R, about the axis of rotation, A-A.

Referring to FIG. 5A$_X$, a plurality of one or more X component centroid area measurement 75a$_X$ are shown according to an embodiment. Referring to FIG. 5A$_Y$, a plurality of one or more Y component centroid area measurement 75a$_Y$ are shown according to an embodiment. Each X/Y component centroid area measurement 75a$_X$/75a$_Y$ is paired with angular orientations, $\theta_{TW}$, of the tire, T, as a result of the rotational angular detector 18 sending a signal to the computer 14 as described above. In some examples, the imaging devices $12_1$, $12_2$, $12_3$, $12_4$ may capture images of the tire, T, for each degree of revolution (e.g., $\theta_1$, $\theta_2$, $\theta_3$, etc.) of the tire-wheel assembly, TW, over a full 360° revolution (e.g., $\theta_1$-$\theta_{360}$) of the tire-wheel assembly, TW, in order for the computer 14 to calculate an X/Y component centroid area measurement 75a$_X$/75a$_Y$ for each degree of revolution of the tire-wheel assembly, TW; collectively, the X/Y component centroid area measurement 75a$_X$/75a$_Y$ for each degree of revolution of the tire-wheel assembly, TW, over a full 360° revolution (e.g., $\theta_1$-$\theta_{360}$) of the tire-wheel assembly, TW, may be referred to as a set of X/Y component centroid area measurements 75a$_X$'/75a$_Y$'.

In other instances, the imaging devices $12_1$, $12_2$, $12_3$, $12_4$ may further capture images of the tire, T, for each degree of revolution (e.g., $\theta_{361}$, $\theta_{362}$, $\theta_{363}$, etc.) of the tire-wheel assembly, TW, over another 360° revolution (e.g., $\theta_{361}$-$\theta_{720}$) of the tire-wheel assembly, TW, in order for the computer 14 to calculate a supplemental X/Y component centroid area measurement 75a$_X$/75a$_Y$ for each degree of revolution of the tire-wheel assembly, TW. By capturing one or more sets of supplemental X/Y component centroid area measurement 75a$_X$", 75a$_X$'"/75a$_Y$", 75a$_Y$'" (at, e.g., $\theta_{361}$-$\theta_{720}$, $\theta_{721}$-$\theta_{1080}$, etc.), the first (baseline) set of X/Y component centroid area measurement 75a$_X$'/75a$_Y$' may be compared to one or more of the one or more sets of supplemental X/Y component centroid area measurement 75a$_X$", 75a$_X$'"/75a$_Y$", 75a$_Y$'" in order to verify uniformity (or lack thereof) of the tire, T, occurring at one or more specific angular orientations, $\theta_{TW}$, of the tire, T, as the tire, T, is rotated, R, about the axis of rotation, A-A.

Referring to FIG. 6A, a method 100a for determining uniformity of a tire, T, of an inflated tire-wheel assembly, TW, is described according to an embodiment. The methodology 100a described in FIG. 6A employs the two-dimensional analysis associated with the system of FIG. 2A.

In a first step 102a, the inflated tire-wheel assembly, TW, is rotatably-fixed upon the axis of rotation, A-A. In an example, an axial support member (not shown) aligned with the axis of rotation, A-A, may be extended through a central opening of the wheel, W, for rotatably-fixing the inflated tire-wheel assembly, TW, upon the axis of rotation, A-A. In some implementations, the motor 16 may be a component of or connected to the axial support member.

Referring to step 104a, the plurality of imaging devices 12 may be selectively adjusted (i.e., configured/tuned/calibrated) by an operator of the system 10 such that the offset plane, $P_1$, traversing the plurality of imaging devices 12 are arranged at the distance, d, away from the reference plane, $P_2$. As explained above, in some implementations, the plurality of imaging devices 12 may be connected to a common carrier (not shown) in a pre-arranged manner; accordingly, upon adjustment of the common carrier at the distance, d, away from the from the reference plane, $P_2$, the arrangement of the plurality of imaging devices 12 within the offset plane, $P_1$, may be maintained. By selectively adjusting the he offset plane, $P_1$, at the distance, d, the intersection of the offset plane, $P_1$, defined by the plurality of imaging devices 12 with the tire, T, of the tire-wheel assembly, TW, may be selectively controlled by the operator.

Referring to steps 106a-114a, an example of the method 100a employed by the computer 14 may result in obtaining an image of the tire, T, from each imaging device $12_1$, $12_2$, $12_3$, $12_4$ of the plurality of imaging devices 12 on a predetermined basis. In an example, the predetermined basis employed by the method 100a and executed by the computer 14 may be pre-programmed (or, alternatively, selectively programmed by a user) to obtain an image from each imaging device $12_1$, $12_2$, $12_3$, $12_4$ of the plurality of imaging devices 12 at every instance that the inflated tire-wheel assembly, TW, is angularly rotated, R (e.g., $\theta_{TW}$), by an angular amount (see, e.g., a°, b°, as described below) as a result of the motor 16 rotating, R, the tire-wheel assembly, TW.

Referring to step 106a, the computer 14 may be initialized to monitor for rotation, R (according to the angle, $\theta_{TW}$), of the inflated tire-wheel assembly, TW, about the axis of rotation, A-A, at an angular amount. In an example, the initialized angular amount may be equal to a number in degrees (e.g., a°). In some implementations, the initialized angular amount may be one degree (i.e., 1°). In some instances, the initialized angular amount, a°, may be pre-programmed (or, alternatively, selectively programmed by a user).

Referring to step 108a, the computer 14 may activate the motor 16 for driving rotation, R, of the inflated tire-wheel assembly, TW, about the axis of rotation, A-A. At step 110a, as a result of activating the motor 16, the inflated tire-wheel assembly, TW, is rotated about the axis of rotation, A-A.

At step 112a, the rotational angular detector 18 sends a signal to the computer 14 for informing the computer 14 of the detected rotational amount, $\theta_{TW}$, that the inflated tire-wheel assembly, TW, has been rotated, R; upon receiving the signal from the rotational angular detector 18, the computer 14 determines if the inflated tire-wheel assembly, TW, has been rotated, R, about the axis of rotation, A-A, by the initialized angular amount, $\theta_{TW}=a°$. If the computer 14 determines that the inflated tire-wheel assembly, TW, has not been rotated, R, about the axis of rotation, A-A, by the initialized angular amount, $\theta_{TW}=a°$, the method 100a is looped from step 112a back to step 110a for continued rotation, R, of the inflated tire-wheel assembly, TW, about the axis of rotation, A-A. However, when the computer 14 receives a signal from the rotational angular detector 18 indicative of the rotational amount, $\theta_{TW}$, of the tire-wheel assembly, TW, being rotated, R, about the axis of rotation, A-A, to an amount that is equal to the initialized angular amount, $\theta_{TW}$, the method 100a is advanced from step 112a to step 114a.

At step 114a, the computer 14 actuates the plurality of imaging devices 12 for obtaining images of the tire, T, of the inflated tire-wheel assembly, TW. In an example, at step 116a, the computer 14 utilizes the images of the tire, T, for calculating a cut section area measurement 50a (see, e.g., $\theta_1$, 50a of FIG. 4A) of the tire, T, based on the closed perimeter of the surfaces (e.g., the upper sidewall surface, $T_{SU}$, the lower sidewall surface, $T_{SL}$, the tread surface, $T_T$, or the like) of the tire, T, defined by the intersection of the offset plane, $P_1$, with the tire, T. In an example, at step 118a, the computer 14 utilizes the images of the tire, T, for calculating a cut section X component centroid area measurement $75a_X$ (see, e.g., $\theta_1$, $75a_X$ of FIG. $5A_X$) of the tire, T, based on the closed perimeter of the surfaces (e.g., the upper sidewall surface, $T_{SU}$, the lower sidewall surface, $T_{SL}$, the tread surface, $T_T$, or the like) of the tire, T, defined by the intersection of the offset plane, $P_1$, with the tire, T. In an example, at step 120a, the computer 14 utilizes the images of the tire, T, for calculating a cut section Y component centroid area measurement $75a_Y$ (see, e.g., $\theta_1$, $75a_Y$ of FIG. $5A_Y$) of the tire, T, based on the closed perimeter of the surfaces (e.g., the upper sidewall surface, $T_{SU}$, the lower sidewall surface, $T_{SL}$, the tread surface, $T_T$, or the like) of the tire, T, defined by the intersection of the offset plane, $P_1$, with the tire, T.

After conducting the calculating steps 116a, 118a, 120a as described above, the method 100a may be advanced to step 122a where the computer 14 increments the monitored initialize angular amount, $\theta_{TW}=a°$, of the tire-wheel assembly, TW, by an angular increment amount. In an example, the angular increment amount may be equal to a number in degrees (e.g., b°). In some implementations, the angular increment amount may be one degree (i.e., 1°). In some instances, the angular increment amount, b°, may be pre-programmed (or, alternatively, selectively programmed by a user).

At step 124a, an example of the methodology 100a employed by the computer 14 may determine if the incremented monitored rotational amount, $\theta_{TW}=\theta_{TW}+b°$, is greater than a maximum rotational amount, c°. In some implementations, the maximum rotational amount may be three-hundred-and-sixty degrees (i.e., 360°), which is equivalent to one full revolution of the tire-wheel assembly, TW. In other implementations, the maximum rotational amount may be seven-hundred-and-twenty degrees (i.e., 720°), which is equivalent to two full revolutions of the tire-wheel assembly, TW. In other implementations, the maximum rotational amount may be one-thousand-and-eighty degrees (i.e., 1080°), which is equivalent to three full revolutions of the tire-wheel assembly, TW. In some instances, the maximum rotational amount, c°, may be pre-programmed (or, alternatively, selectively programmed by a user).

At step 124a, if the computer 14 determines that the inflated tire-wheel assembly, TW, has not been rotated, R, about the axis of rotation, A-A, by an amount greater than the maximum rotational amount, c°, the method 100a is looped from step 124a back to step 110a for continued rotation, R, of the inflated tire-wheel assembly, TW, about the axis of rotation, A-A, and, where steps 112a-122a are repeated in order to calculate additional area measurements 50a (see, e.g., $\theta_2$-$\theta_{1080}$, 50a of FIG. 4A) and centroid area measurements $75a_X$, $75a_Y$ (see, e.g., $\theta_2$-$\theta_{1080}$, $75a_X$ of FIG. $5A_X$ and $\theta_2$-$\theta_{1080}$, $75a_Y$ of FIG. $5A_Y$). However, when the computer 14 determines that the inflated tire-wheel assembly, TW, has been rotated, R, about the axis of rotation, A-A, by an amount greater than the maximum rotational amount, c°, the method 100a is advanced to step 126a.

At step 126a, the computer 14 may associate the calculated area measurements 50a and centroid measurements $75a_X$, $75a_Y$ (at, e.g., $\theta_1$-$\theta_{1080}$) into data set groups (see, e.g., 50a', 50a'', 50a''' in FIG. 4A; $75a_X'$, $75a_X''$, $75a_X'''$ in FIG. $5A_X$, and $75a_Y'$, $75a_Y''$, $75a_Y'''$ in FIG. $5A_Y$). In some instances, each data set group (see, e.g., 50a', 50a'', 50a''' in FIG. 4A; $75a_X'$, $75a_X''$, $75a_X'''$ in FIG. $5A_X$, and $75a_Y'$, $75a_Y''$, $75a_Y'''$ in FIG. $5A_Y$) may be associated with a complete revolution (e.g., $\theta_1$-$\theta_{360}$, $\theta_{361}$-$\theta_{720}$, $\theta_{721}$-$\theta_{1080}$, etc.) of the tire-wheel assembly, TW.

At step 128a, the computer 14 may conduct a Fast Fourier Trans (FFT) for each data set group (see, e.g., 50a', 50a'', 50a''' in FIG. 4A; $75a_X'$, $75a_X''$, $75a_X'''$ in FIG. $5A_X$, and $75a_Y'$, $75a_Y''$, $75a_Y'''$ in FIG. $5A_Y$) of the one or more data set groups (see, e.g., 50a', 50a'', 50a''' in FIG. 4A; $75a_X'$, $75a_X''$, $75a_X'''$ in FIG. $5A_X$, and $75a_Y'$, $75a_Y''$, $75a_Y'''$ in FIG. $5A_Y$) in order to calculate first, second, and third harmonics relative to the rotation (e.g., $\theta_{TW}=a°$ through $\theta_{TW}=c°$) of the tire-wheel assembly, TW. In view of the calculated harmonics, the computer 14 may algorithmically verify uniformity (or lack thereof) of the tire, T, without contacting the tire, T, with an apparatus, device or component (e.g., a roller) that directly engages and presses into or against the tire, T.

At step 130a, the computer 14 may conduct mathematical operations on any/all of the area measurements (see, e.g., $\theta_1$-$\theta_{1080}$, 50a of FIG. 4A), the X component centroid area measurements (see, e.g., $\theta_1$-$\theta_{1080}$, $75a_X$ of FIG. $5A_X$) and the Y component centroid area measurements (see, e.g., $\theta_1$-$\theta_{1080}$, $75a_Y$ of FIG. $5A_Y$) during the rotation (e.g., $\theta_{TW}=a°$ through $\theta_{TW}=c°$) of the tire-wheel assembly, TW, to create a road force variation number based on correlation/analysis. In view of the determined road force variation number, the computer 14 may algorithmically verify uniformity (or lack thereof) of the tire, T, without contacting the tire, T, with an apparatus, device or component (e.g., a roller) that directly engages and presses into or against the tire, T.

Referring to FIG. 2B, the three-dimensional calculations may be derived from an "X component," a "Y component" and a "Z component" of the virtual cut sections, VC. In order to provide a frame of reference of the X, Y and Z components, a three dimensional Cartesian coordinate system (showing X-Y-Z coordinate axes) is represented in the margin of FIG. 2B. In an example, the three-dimensional calculations may include one or more volume measurements 50b (that are measured in, for example, $cm^3$) of the tire, T. In another example, the three-dimensional calculations may also include one or more X component centroid volume measurements $75b_X$ (that are measured in, for example, mm), one or more Y component centroid volume measurements $75b_Y$ (that are measured in, for example, mm), and one or more Z component centroid volume measurements $75b_Z$ (that are measured in, for example, mm).

Referring to FIG. 4B, a plurality of volume measurements 50b are shown according to an embodiment. Each volume measurement 50b is paired with angular orientations, $\theta_{TW}$, of the tire, T, as a result of the rotational angular detector 18 sending a signal to the computer 14 as described above. In some examples, the imaging devices $12_1$, $12_2$, $12_3$, $12_4$ may capture images of the tire, T, for each degree of revolution (e.g., $\theta_1$, $\theta_2$, $\theta_3$, etc.) of the tire-wheel assembly, TW, over a full 360° revolution (e.g., $\theta_1$-$\theta_{360}$) of the tire-wheel assembly, TW, in order for the computer 14 to calculate a volume measurement 50b for each degree of revolution of the tire-wheel assembly, TW; collectively, the volume measurement 50b for each degree of revolution of the tire-wheel assembly, TW, over a full 360° revolution (e.g., $\theta_1$-$\theta_{360}$) of the tire-wheel assembly, TW, may be referred to as a set of volume measurements 50b'.

In other instances, the imaging devices $12_1$, $12_2$, $12_3$, $12_4$ may further capture images of the tire, T, for each degree of revolution (e.g., $\theta_{361}$, $\theta_{362}$, $\theta_{363}$, etc.) of the tire-wheel assembly, TW, over another 360° revolution (e.g., $\theta_{361}$-$\theta_{720}$) of the tire-wheel assembly, TW, in order for the computer 14 to calculate a supplemental volume measurement 50b for each degree of revolution of the tire-wheel assembly, TW. By capturing one or more sets of supplemental volume measurements 50b", 50b''' (at, e.g., $\theta_{361}$-$\theta_{720}$, $\theta_{721}$-$\theta_{1080}$, etc.), the first (baseline) set of volume measurements 50b' may be compared to one or more of the one or more sets of supplemental volume measurements 50b", 50b''' in order to verify uniformity (or lack thereof) of the tire, T, occurring at one or more specific angular orientations, $\theta_{TW}$, of the tire, T, as the tire, T, is rotated, R, about the axis of rotation, A-A.

Referring to FIG. $5B_X$, a plurality of one or more X component centroid volume measurement $75b_X$ are shown according to an embodiment. Referring to FIG. $5B_Y$, a plurality of one or more Y component centroid volume measurement $75b_Y$ are shown according to an embodiment. Referring to FIG. $5B_Z$, a plurality of one or more Z component centroid volume measurement $75b_Z$ are shown according to an embodiment. Each X/Y/Z component centroid volume measurement $75b_X$/$75b_Y$/$75b_Z$ is paired with angular orientations, $\theta_{TW}$, of the tire, T, as a result of the rotational angular detector 18 sending a signal to the computer 14 as described above. In some examples, the imaging devices $12_1$, $12_2$, $12_3$, $12_4$ may capture images of the tire, T, for each degree of revolution (e.g., $\theta_1$, $\theta_2$, $\theta_3$, etc.) of the tire-wheel assembly, TW, over a full 360° revolution (e.g., $\theta_1$-$\theta_{360}$) of the tire-wheel assembly, TW, in order for the computer 14 to calculate an X/Y/Z component centroid volume measurement $75b_X$/$75b_Y$/$75b_Z$ for each degree of revolution of the tire-wheel assembly, TW; collectively, the X/Y/Z component centroid volume measurement $75b_X$/$75b_Y$/$75b_Z$ for each degree of revolution of the tire-wheel assembly, TW, over a full 360° revolution (e.g., $\theta_1$-$\theta_{360}$) of the tire-wheel assembly, TW, may be referred to as a set of X/Y/Z component centroid volume measurements $75b_X'$/$75b_Y'$/$75b_Z'$.

In other instances, the imaging devices $12_1$, $12_2$, $12_3$, $12_4$ may further capture images of the tire, T, for each degree of revolution (e.g., $\theta_{361}$, $\theta_{362}$, $\theta_{363}$, etc.) of the tire-wheel assembly, TW, over another 360° revolution (e.g., $\theta_{361}$-$\theta_{720}$) of the tire-wheel assembly, TW, in order for the computer 14 to calculate a supplemental X/Y/Z component centroid volume measurement $75b_X$/$75b_Y$/$75b_Z$ for each degree of revolution of the tire-wheel assembly, TW. By capturing one or more sets of supplemental X/Y/Z component centroid volume measurement $75b_X''$, $75b_X'''$/$75b_Y''$, $75b_Y'''$/$75b_Z''$, $75b_Z'''$ (at, e.g., $\theta_{361}$-$\theta_{720}$, $\theta_{721}$-$\theta_{1080}$, etc.), the first (baseline) set of X/Y/Z component centroid volume measurement $75b_X'$/$75b_Y'$/$75b_Z'$ may be compared to one or more of the one or more sets of supplemental X/Y/Z component centroid volume measurement $75b_X''$, $75b_X'''$/$75b_Y''$, $75b_Y'''$/$75b_Z''$, $75b_Z'''$ in order to verify uniformity (or lack thereof) of the tire, T, occurring at one or more specific angular orientations, $\theta_{TW}$, of the tire, T, as the tire, T, is rotated, R, about the axis of rotation, A-A.

Referring to FIG. 6B, a method 100b for determining uniformity of a tire, T, of an inflated tire-wheel assembly, TW, is described according to an embodiment. The methodology 100b described in FIG. 6B employs the three-dimensional analysis associated with the system of FIG. 2B.

In a first step 102b, the inflated tire-wheel assembly, TW, is rotatably-fixed upon the axis of rotation, A-A. In an example, an axial support member (not shown) aligned with the axis of rotation, A-A, may be extended through a central opening of the wheel, W, for rotatably-fixing the inflated tire-wheel assembly, TW, upon the axis of rotation, A-A. In some implementations, the motor 16 may be a component of or connected to the axial support member.

Referring to step 104b, the plurality of imaging devices 12 may be selectively adjusted (i.e., configured/tuned/calibrated) by an operator of the system 10 such that the offset plane, $P_1$, traversing the plurality of imaging devices 12 are arranged at the distance, d, away from the reference plane, $P_2$. As explained above, in some implementations, the plurality of imaging devices 12 may be connected to a common carrier (not shown) in a pre-arranged manner; accordingly, upon adjustment of the common carrier at the distance, d, away from the from the reference plane, $P_2$, the arrangement of the plurality of imaging devices 12 within the offset plane, $P_1$, may be maintained. By selectively adjusting the he offset plane, $P_1$, at the distance, d, the intersection of the offset plane, $P_1$, defined by the plurality of imaging devices 12 with the tire, T, of the tire-wheel assembly, TW, may be selectively controlled by the operator.

Referring to steps 106b-114b, an example of the method 100b employed by the computer 14 may result in obtaining an image of the tire, T, from each imaging device $12_1$, $12_2$, $12_3$, $12_4$ of the plurality of imaging devices 12 on a predetermined basis. In an example, the predetermined basis employed by the method 100b and executed by the computer 14 may be pre-programmed (or, alternatively, selectively programmed by a user) to obtain an image from each imaging device $12_1$, $12_2$, $12_3$, $12_4$ of the plurality of imaging devices 12 at every instance that the inflated tire-wheel assembly, TW, is angularly rotated, R (e.g., $\theta_{TW}$), by an angular amount (see, e.g., a°, b°, as described below) as a result of the motor 16 rotating, R, the tire-wheel assembly, TW.

Referring to step 106b, the computer 14 may be initialized to monitor for rotation, R (according to the angle, $\theta_{TW}$), of the inflated tire-wheel assembly, TW, about the axis of rotation, A-A, at an angular amount. In an example, the initialized angular amount may be equal to a number in degrees (e.g., a°). In some implementations, the initialized angular amount may be one degree (i.e., 1°). In some instances, the initialized angular amount, a°, may be pre-programmed (or, alternatively, selectively programmed by a user).

Referring to step 108b, the computer 14 may activate the motor 16 for driving rotation, R, of the inflated tire-wheel assembly, TW, about the axis of rotation, A-A. At step 110b, as a result of activating the motor 16, the inflated tire-wheel assembly, TW, is rotated about the axis of rotation, A-A.

At step 112b, the rotational angular detector 18 sends a signal to the computer 14 for informing the computer 14 of the detected rotational amount, $\theta_{TW}$, that the inflated tire-wheel assembly, TW, has been rotated, R; upon receiving the signal from the rotational angular detector 18, the computer 14 determines if the inflated tire-wheel assembly, TW, has been rotated, R, about the axis of rotation, A-A, by the initialized angular amount, $\theta_{TW}=a°$. If the computer 14 determines that the inflated tire-wheel assembly, TW, has not been rotated, R, about the axis of rotation, A-A, by the initialized angular amount, $\theta_{TW}=a°$, the method 100b is looped from step 112b back to step 110b for continued rotation, R, of the inflated tire-wheel assembly, TW, about the axis of rotation, A-A. However, when the computer 14 receives a signal from the rotational angular detector 18 indicative of the rotational amount, $\theta_{TW}$, of the tire-wheel assembly, TW, being rotated, R, about the axis of rotation, A-A, to an amount that is equal to the initialized angular amount, $\theta_{TW}$, the method 100b is advanced from step 112b to step 114b.

At step 114b, the computer 14 actuates the plurality of imaging devices 12 for obtaining images of the tire, T, of the inflated tire-wheel assembly, TW. In an example, at step 116b, the computer 14 utilizes the images of the tire, T, for calculating a cut section volume measurement 50b (see, e.g., $\theta_1$, 50b of FIG. 4B) of the tire, T, based on the closed perimeter of the surfaces (e.g., the upper sidewall surface, $T_{SU}$, the lower sidewall surface, $T_{SL}$, the tread surface, $T_T$, or the like) of the tire, T, defined by the intersection of the offset plane, $P_1$, with the tire, T. In an example, at step 118b, the computer 14 utilizes the images of the tire, T, for calculating a cut section X component centroid volume measurement $75b_X$ (see, e.g., $\theta_1$, $75b_X$ of FIG. $5B_X$) of the tire, T, based on the closed perimeter of the surfaces (e.g., the upper sidewall surface, $T_{SU}$, the lower sidewall surface, $T_{SL}$, the tread surface, $T_T$, or the like) of the tire, T, defined by the intersection of the offset plane, $P_1$, with the tire, T. In an example, at step 120b, the computer 14 utilizes the images of the tire, T, for calculating a cut section Y component centroid volume measurement $75b_Y$ (see, e.g., $\theta_1$, $75b_Y$ of FIG. $5B_Y$) of the tire, T, based on the closed perimeter of the surfaces (e.g., the upper sidewall surface, $T_{SU}$, the lower sidewall surface, $T_{SL}$, the tread surface, $T_T$, or the like) of the tire, T, defined by the intersection of the offset plane, $P_1$, with the tire, T. In an example, at step 120b', the computer 14 utilizes the images of the tire, T, for calculating a cut section Z component centroid volume measurement $75b_Z$ (see, e.g., $\theta_1$, $75b_Z$ of FIG. $5B_Z$) of the tire, T, based on the closed perimeter of the surfaces (e.g., the upper sidewall surface, $T_{SU}$, the lower sidewall surface, $T_{SL}$, the tread surface, $T_T$, or the like) of the tire, T, defined by the intersection of the offset plane, $P_1$, with the tire, T.

After conducting the calculating steps 116b, 118b, 120b, 120b' as described above, the method 100b may be advanced to step 122b where the computer 14 increments the monitored initialize angular amount, $\theta_{TW}=a°$, of the tire-wheel assembly, TW, by an angular increment amount. In an example, the angular increment amount may be equal to a number in degrees (e.g., b°). In some implementations, the angular increment amount may be one degree (i.e., 1°). In some instances, the angular increment amount, b°, may be pre-programmed (or, alternatively, selectively programmed by a user).

At step 124b, an example of the methodology 100b employed by the computer 14 may determine if the incremented monitored rotational amount, $\theta_{TW}=\theta_{TW}+b°$, is greater than a maximum rotational amount, c°. In some implementations, the maximum rotational amount may be three-hundred-and-sixty degrees (i.e., 360°), which is equivalent to one full revolution of the tire-wheel assembly, TW. In other implementations, the maximum rotational amount may be seven-hundred-and-twenty degrees (i.e., 720°), which is equivalent to two full revolutions of the tire-wheel assembly, TW. In other implementations, the maximum rotational amount may be one-thousand-and-eighty degrees (i.e., 1080°), which is equivalent to three full revolutions of the tire-wheel assembly, TW. In some instances, the maximum rotational amount, c°, may be pre-programmed (or, alternatively, selectively programmed by a user).

At step 124b, if the computer 14 determines that the inflated tire-wheel assembly, TW, has not been rotated, R, about the axis of rotation, A-A, by an amount greater than the maximum rotational amount, c°, the method 100b is looped from step 124b back to step 110b for continued rotation, R, of the inflated tire-wheel assembly, TW, about the axis of rotation, A-A, and, where steps 112b-122b are repeated in order to calculate additional volume measurements 50b (see, e.g., $\theta_2$-$\theta_{1080}$, 50b of FIG. 4B) and centroid volume measurements $75b_X$, $75b_Y$, $75b_Z$ (see, e.g., $\theta_2$-$\theta_{1080}$, $75b_X$ of FIG. $5B_X$, $\theta_2$-$\theta_{1080}$, $75b_Y$ of FIG. $5B_Y$ and $\theta_2$-$\theta_{1080}$, $75b_Z$ of FIG. $5B_Z$). However, when the computer 14 determines that the inflated tire-wheel assembly, TW, has been rotated, R, about the axis of rotation, A-A, by an amount greater than the maximum rotational amount, c°, the method 100b is advanced to step 126b.

At step 126b, the computer 14 may associate the calculated volume measurements 50b and centroid measurements $75b_X$, $75b_Y$, $75b_Z$ (at, e.g., $\theta_1$-$\theta_{1080}$) into data set groups (see, e.g., 50b', 50b'', 50b''' in FIG. 4B; $75b_X'$, $75b_X''$, $75b_X'''$ in FIG. $5B_X$, and $75b_Y'$, $75b_Y''$, $75b_Y'''$ in FIG. $5B_Y$). In some instances, each data set group (see, e.g., 50b', 50b'', 50b''' in FIG. 4B; $75b_X'$, $75b_X''$, $75b_X'''$ in FIG. $5B_X$, and $75b_Y'$, $75b_Y''$, $75b_Y'''$ in FIG. $5B_Y$) may be associated with a complete revolution (e.g., $\theta_1$-$\theta_{360}$, $\theta_{361}$-$\theta_{720}$, $\theta_{721}$-$\theta_{1080}$, etc.) of the tire-wheel assembly, TW.

At step 128b, the computer 14 may conduct a Fast Fourier Trans (FFT) for each data set group (see, e.g., 50b', 50b'', 50b''' in FIG. 4B; $75b_X'$, $75b_X''$, $75b_X'''$ in FIG. $5B_X$, and $75b_Y'$, $75b_Y''$, $75b_Y'''$ in FIG. $5B_Y$) of the one or more data set groups (see, e.g., 50b', 50b'', 50b''' in FIG. 4B; $75b_X'$, $75b_X''$, $75b_X'''$ in FIG. $5B_X$, and $75b_Y'$, $75b_Y''$, $75b_Y'''$ in FIG. $5B_Y$) in order to calculate first, second, and third harmonics relative to the rotation (e.g., $\theta_{TW}=a°$ through $\theta_{TW}=c°$) of the tire-wheel assembly, TW. In view of the calculated harmonics, the computer 14 may algorithmically verify uniformity (or lack thereof) of the tire, T, without contacting the tire, T, with an apparatus, device or component (e.g., a roller) that directly engages and presses into or against the tire, T.

At step 130b, the computer 14 may conduct mathematical operations on any/all of the volume measurements (see, e.g., $\theta_1$-$\theta_{1080}$, 50b of FIG. 4B), the X component centroid volume measurements (see, e.g., $\theta_1$-$\theta_{1080}$, $75b_X$ of FIG. $5B_X$), the Y component centroid volume measurements (see, e.g., $\theta_1$-$\theta_{1080}$, $75b_Y$ of FIG. $5B_Y$) and the Z component centroid volume measurements (see, e.g., $\theta_1$-$\theta_{1080}$, $75b_Z$ of FIG. $5B_Z$) during the rotation (e.g., $\theta_{TW}=a°$ through $\theta_{TW}=c°$) of the tire-wheel assembly, TW, to create a road force variation number based on correlation/analysis. In view of the determined road force variation number, the computer 14 may algorithmically verify uniformity (or lack thereof) of the tire, T, without contacting the tire, T, with an apparatus, device or component (e.g., a roller) that directly engages and presses into or against the tire, T.

Although a method 100a for determining uniformity of a tire, T, of an inflated tire-wheel assembly, TW, has been described above that utilizes the two-dimensional analysis associated with the system of FIG. 2A, and, although a method 100b for determining uniformity of a tire, T, of an inflated tire-wheel assembly, TW, has been described above that utilizes the three-dimensional analysis associated with the system of FIG. 2B, the system 10 is not limited to the methodologies 100a, 100b. In an example as seen in FIG. 6C, a method 100c for determining one or more characteristics (e.g., uniformity) of a tire, T, of an inflated tire-wheel assembly, TW, is shown that may utilize the two-dimensional analysis associated with the system of FIG. 2A.

In a first step 102c, the inflated tire-wheel assembly, TW, is rotatably-fixed upon the axis of rotation, A-A. In an example, an axial support member (not shown) aligned with the axis of rotation, A-A, may be extended through a central opening of the wheel, W, for rotatably-fixing the inflated tire-wheel assembly, TW, upon the axis of rotation, A-A. In some implementations, the motor 16 may be a component of or connected to the axial support member.

Referring to step 104c, the plurality of imaging devices 12 may be selectively adjusted (i.e., configured/tuned/calibrated) by an operator of the system 10 such that the offset plane, $P_1$, traversing the plurality of imaging devices 12 are arranged at the distance, d, away from the reference plane, $P_2$. As explained above, in some implementations, the plurality of imaging devices 12 may be connected to a common carrier (not shown) in a pre-arranged manner; accordingly, upon adjustment of the common carrier at the distance, d, away from the from the reference plane, $P_2$, the arrangement of the plurality of imaging devices 12 within the offset plane, $P_1$, may be maintained. By selectively adjusting the he offset plane, $P_1$, at the distance, d, the intersection of the offset plane, $P_1$, defined by the plurality of imaging devices 12 with the tire, T, of the tire-wheel assembly, TW, may be selectively controlled by the operator.

Referring to steps 106c-114c, an example of the method 100c employed by the computer 14 may result in obtaining an image of the tire, T, from each imaging device $12_1$, $12_2$, $12_3$, $12_4$ of the plurality of imaging devices 12 on a predetermined basis. In an example, the predetermined basis employed by the method 100c and executed by the computer 14 may be pre-programmed (or, alternatively, selectively programmed by a user) to obtain an image from each imaging device $12_1$, $12_2$, $12_3$, $12_4$ of the plurality of imaging devices 12 at every instance that the inflated tire-wheel assembly, TW, is angularly rotated, R (e.g., $\theta_{TW}$), by an angular amount (see, e.g., a°, b°, as described below) as a result of the motor 16 rotating, R, the tire-wheel assembly, TW.

Referring to step 106c, the computer 14 may be initialized to monitor for rotation, R (according to the angle, $\theta_{TW}$), of the inflated tire-wheel assembly, TW, about the axis of rotation, A-A, at an angular amount. In an example, the initialized angular amount may be equal to a number in degrees (e.g., a°). In some implementations, the initialized angular amount may be one degree (i.e., 1°). In some instances, the initialized angular amount, a°, may be pre-programmed (or, alternatively, selectively programmed by a user).

Referring to step 108c, the computer 14 may activate the motor 16 for driving rotation, R, of the inflated tire-wheel assembly, TW, about the axis of rotation, A-A. At step 110c, as a result of activating the motor 16, the inflated tire-wheel assembly, TW, is rotated about the axis of rotation, A-A.

At step 112c, the rotational angular detector 18 sends a signal to the computer 14 for informing the computer 14 of the detected rotational amount, $\theta_{TW}$, that the inflated tire-wheel assembly, TW, has been rotated, R; upon receiving the signal from the rotational angular detector 18, the computer 14 determines if the inflated tire-wheel assembly, TW, has been rotated, R, about the axis of rotation, A-A, by the initialized angular amount, $\theta_{TW}=a°$. If the computer 14 determines that the inflated tire-wheel assembly, TW, has not been rotated, R, about the axis of rotation, A-A, by the initialized angular amount, $\theta_{TW}=a°$, the method 100c is looped from step 112c back to step 110c for continued rotation, R, of the inflated tire-wheel assembly, TW, about the axis of rotation, A-A. However, when the computer 14 receives a signal from the rotational angular detector 18 indicative of the rotational amount, $\theta_{TW}$, of the tire-wheel assembly, TW, being rotated, R, about the axis of rotation, A-A, to an amount that is equal to the initialized angular amount, $\theta_{TW}$, the method 100c is advanced from step 112c to step 114c.

At step 114c, the computer 14 actuates the plurality of imaging devices 12 for obtaining images of the tire, T, of the inflated tire-wheel assembly, TW. After obtaining images of the tire, T, of the inflated tire-wheel assembly, TW, as described above, the method 100c may be advanced to step 116c where the computer 14 increments the monitored initialize angular amount, $\theta_{TW}=a°$, of the tire-wheel assembly, TW, by an angular increment amount. In an example, the angular increment amount may be equal to a number in degrees (e.g., b°). In some implementations, the angular increment amount may be one degree (i.e., 1°). In some instances, the angular increment amount, b°, may be pre-programmed (or, alternatively, selectively programmed by a user).

At step 118c, an example of the methodology 100c employed by the computer 14 may determine if the incremented monitored rotational amount, $\theta_{TW}=\theta_{TW}+b°$, is greater than a maximum rotational amount, c°. In some implementations, the maximum rotational amount may be three-hundred-and-sixty degrees (i.e., 360°), which is equivalent to one full revolution of the tire-wheel assembly, TW. In other implementations, the maximum rotational amount may be seven-hundred-and-twenty degrees (i.e., 720°), which is equivalent to two full revolutions of the tire-wheel assembly, TW. In other implementations, the maximum rotational amount may be one-thousand-and-eighty degrees (i.e., 1080°), which is equivalent to three full revolutions of the tire-wheel assembly, TW. In some instances, the maximum rotational amount, c°, may be pre-programmed (or, alternatively, selectively programmed by a user).

At step 118c, if the computer 14 determines that the inflated tire-wheel assembly, TW, has not been rotated, R, about the axis of rotation, A-A, by an amount greater than the maximum rotational amount, c°, the method 100c is looped from step 118c back to step 110c for continued rotation, R, of the inflated tire-wheel assembly, TW, about the axis of rotation, A-A, and, where steps 112c-116c are repeated.

Referring to step 120c, the computer 14 utilizes the images of the tire, T, at one or more of each imaged instance of the tire, T (from e.g., $\theta_1$-$\theta_{1080}$, as described above), for calculating at least one cut section area measurement 50a (see, e.g., $\theta_1$, 50a of FIG. 4A) of the tire, T, based on the closed perimeter of the surfaces (e.g., the upper sidewall surface, $T_{SU}$, the lower sidewall surface, $T_{SL}$, the tread surface, $T_T$, or the like) of the tire, T, defined by the intersection of the offset plane, $P_1$, with the tire, T.

Although methods 100a, 100c for determining uniformity of a tire, T, of an inflated tire-wheel assembly, TW, has been described above that utilizes the two-dimensional analysis associated with the system of FIG. 2A, and, although a method 100b for determining at least one characteristic (e.g., uniformity) of a tire, T, of an inflated tire-wheel assembly, TW, has been described above that utilizes the three-dimensional analysis associated with the system of FIG. 2B, the system 10 is not limited to the methodologies 100a, 100b, 100c. In an example as seen in FIG. 6D, a method 100d for determining one or more characteristics (e.g., uniformity) of a tire, T, of an inflated tire-wheel assembly, TW, is shown that may utilize the three-dimensional analysis associated with the system of FIG. 2B.

In a first step 102d, the inflated tire-wheel assembly, TW, is rotatably-fixed upon the axis of rotation, A-A. In an example, an axial support member (not shown) aligned with the axis of rotation, A-A, may be extended through a central opening of the wheel, W, for rotatably-fixing the inflated tire-wheel assembly, TW, upon the axis of rotation, A-A. In some implementations, the motor 16 may be a component of or connected to the axial support member.

Referring to step 104d, the plurality of imaging devices 12 may be selectively adjusted (i.e., configured/tuned/calibrated) by an operator of the system 10 such that the offset plane, $P_1$, traversing the plurality of imaging devices 12 are arranged at the distance, d, away from the reference plane, $P_2$. As explained above, in some implementations, the plurality of imaging devices 12 may be connected to a common carrier (not shown) in a pre-arranged manner; accordingly, upon adjustment of the common carrier at the distance, d, away from the from the reference plane, $P_2$, the arrangement of the plurality of imaging devices 12 within the offset plane, $P_1$, may be maintained. By selectively adjusting the he offset plane, $P_1$, at the distance, d, the intersection of the offset plane, $P_1$, defined by the plurality of imaging devices 12 with the tire, T, of the tire-wheel assembly, TW, may be selectively controlled by the operator.

Referring to steps 106d-114d, an example of the method 100d employed by the computer 14 may result in obtaining an image of the tire, T, from each imaging device $12_1$, $12_2$, $12_3$, $12_4$ of the plurality of imaging devices 12 on a predetermined basis. In an example, the predetermined basis employed by the method 100d and executed by the computer 14 may be pre-programmed (or, alternatively, selectively programmed by a user) to obtain an image from each imaging device $12_1$, $12_2$, $12_3$, $12_4$ of the plurality of imaging devices 12 at every instance that the inflated tire-wheel assembly, TW, is angularly rotated, R (e.g., $\theta_{TW}$), by an angular amount (see, e.g., a°, b°, as described below) as a result of the motor 16 rotating, R, the tire-wheel assembly, TW.

Referring to step 106d, the computer 14 may be initialized to monitor for rotation, R (according to the angle, $\theta_{TW}$), of the inflated tire-wheel assembly, TW, about the axis of rotation, A-A, at an angular amount. In an example, the initialized angular amount may be equal to a number in degrees (e.g., a°). In some implementations, the initialized angular amount may be one degree (i.e., 1°). In some instances, the initialized angular amount, a°, may be pre-programmed (or, alternatively, selectively programmed by a user).

Referring to step 108d, the computer 14 may activate the motor 16 for driving rotation, R, of the inflated tire-wheel assembly, TW, about the axis of rotation, A-A. At step 110d, as a result of activating the motor 16, the inflated tire-wheel assembly, TW, is rotated about the axis of rotation, A-A.

At step 112d, the rotational angular detector 18 sends a signal to the computer 14 for informing the computer 14 of the detected rotational amount, $\theta_{TW}$, that the inflated tire-wheel assembly, TW, has been rotated, R; upon receiving the signal from the rotational angular detector 18, the computer 14 determines if the inflated tire-wheel assembly, TW, has been rotated, R, about the axis of rotation, A-A, by the initialized angular amount, $\theta_{TW}$=a°. If the computer 14 determines that the inflated tire-wheel assembly, TW, has not been rotated, R, about the axis of rotation, A-A, by the initialized angular amount, $\theta_{TW}$=a°, the method 100d is looped from step 112d back to step 110d for continued rotation, R, of the inflated tire-wheel assembly, TW, about the axis of rotation, A-A. However, when the computer 14 receives a signal from the rotational angular detector 18 indicative of the rotational amount, $\theta_{TW}$, of the tire-wheel assembly, TW, being rotated, R, about the axis of rotation, A-A, to an amount that is equal to the initialized angular amount, $\theta_{TW}$, the method 100d is advanced from step 112d to step 114d.

At step 114d, the computer 14 actuates the plurality of imaging devices 12 for obtaining images of the tire, T, of the inflated tire-wheel assembly, TW. After obtaining images of the tire, T, of the inflated tire-wheel assembly, TW, as described above, the method 100d may be advanced to step 116d where the computer 14 increments the monitored initialize angular amount, $\theta_{TW}$=a°, of the tire-wheel assembly, TW, by an angular increment amount. In an example, the angular increment amount may be equal to a number in degrees (e.g., b°). In some implementations, the angular increment amount may be one degree (i.e., 1°). In some instances, the angular increment amount, b°, may be pre-programmed (or, alternatively, selectively programmed by a user).

At step 118d, an example of the methodology 100d employed by the computer 14 may determine if the incremented monitored rotational amount, $\theta_{TW}$=$\theta_{TW}$+b°, is greater than a maximum rotational amount, c°. In some implementations, the maximum rotational amount may be three-hundred-and-sixty degrees (i.e., 360°), which is equivalent to one full revolution of the tire-wheel assembly, TW. In other implementations, the maximum rotational amount may be seven-hundred-and-twenty degrees (i.e., 720°), which is equivalent to two full revolutions of the tire-wheel assembly, TW. In other implementations, the maximum rotational amount may be one-thousand-and-eighty degrees (i.e., 1080°), which is equivalent to three full revolutions of the tire-wheel assembly, TW. In some instances, the maximum rotational amount, c°, may be pre-programmed (or, alternatively, selectively programmed by a user).

At step 118d, if the computer 14 determines that the inflated tire-wheel assembly, TW, has not been rotated, R, about the axis of rotation, A-A, by an amount greater than the maximum rotational amount, c°, the method 100d is looped from step 118d back to step 110d for continued rotation, R, of the inflated tire-wheel assembly, TW, about the axis of rotation, A-A, and, where steps 112d-116d are repeated.

Referring to step 120d, the computer 14 utilizes the images of the tire, T, at one or more of each imaged instance of the tire, T (from e.g., $\theta_1$-$\theta_{1080}$, as described above), for calculating at least one cut section volume measurement 50b (see, e.g., $\theta_1$, 50b of FIG. 4B) of the tire, T, based on the closed perimeter of the surfaces (e.g., the upper sidewall surface, $T_{SU}$, the lower sidewall surface, $T_{SL}$, the tread surface, $T_T$, or the like) of the tire, T, defined by the intersection of the offset plane, $P_1$, with the tire, T.

Although methods 100a, 100c for determining uniformity of a tire, T, of an inflated tire-wheel assembly, TW, has been described above that utilizes the two-dimensional analysis associated with the system of FIG. 2A, and, although methods 100b, 100d for determining at least one characteristic (e.g., uniformity) of a tire, T, of an inflated tire-wheel assembly, TW, has been described above that utilizes the three-dimensional analysis associated with the system of FIG. 2B, the system 10 is not limited to the methodologies 100a, 100b, 100c, 100d. In an example as seen in FIG. 6E, a method 100e for determining one or more characteristics (e.g., uniformity) of a tire, T, of an inflated tire-wheel assembly, TW, is shown that may utilize either the two-dimensional analysis associated with the system of FIG. 2A or the three-dimensional analysis associated with the system of FIG. 2B.

In a first step 102e, the inflated tire-wheel assembly, TW, is rotatably-fixed upon the axis of rotation, A-A. In an example, an axial support member (not shown) aligned with the axis of rotation, A-A, may be extended through a central opening of the wheel, W, for rotatably-fixing the inflated tire-wheel assembly, TW, upon the axis of rotation, A-A. In some implementations, the motor 16 may be a component of or connected to the axial support member.

Referring to step 104e, the plurality of imaging devices 12 may be selectively adjusted (i.e., configured/tuned/calibrated) by an operator of the system 10 such that the offset plane, $P_1$, traversing the plurality of imaging devices 12 are arranged at the distance, d, away from the reference plane, $P_2$. As explained above, in some implementations, the plurality of imaging devices 12 may be connected to a common carrier (not shown) in a pre-arranged manner; accordingly, upon adjustment of the common carrier at the distance, d, away from the from the reference plane, $P_2$, the arrangement of the plurality of imaging devices 12 within the offset plane, $P_1$, may be maintained. By selectively adjusting the he offset plane, $P_1$, at the distance, d, the intersection of the offset plane, $P_1$, defined by the plurality of imaging devices 12 with the tire, T, of the tire-wheel assembly, TW, may be selectively controlled by the operator.

Referring to steps 106e-114e, an example of the method 100e employed by the computer 14 may result in obtaining an image of the tire, T, from each imaging device $12_1$, $12_2$, $12_3$, $12_4$ of the plurality of imaging devices 12 on a predetermined basis. In an example, the predetermined basis employed by the method 100e and executed by the computer 14 may be pre-programmed (or, alternatively, selectively programmed by a user) to obtain an image from each imaging device $12_1$, $12_2$, $12_3$, $12_4$ of the plurality of imaging devices 12 at every instance that the inflated tire-wheel assembly, TW, is angularly rotated, R (e.g., $\theta_{TW}$), by an angular amount (see, e.g., a°, b°, as described below) as a result of the motor 16 rotating, R, the tire-wheel assembly, TW.

Referring to step 106e, the computer 14 may be initialized to monitor for rotation, R (according to the angle, $\theta_{TW}$), of the inflated tire-wheel assembly, TW, about the axis of rotation, A-A, at an angular amount. In an example, the initialized angular amount may be equal to a number in degrees (e.g., a°). In some implementations, the initialized angular amount may be one degree (i.e., 1°). In some instances, the initialized angular amount, a°, may be pre-programmed (or, alternatively, selectively programmed by a user).

Referring to step 108e, the computer 14 may activate the motor 16 for driving rotation, R, of the inflated tire-wheel assembly, TW, about the axis of rotation, A-A. At step 110e, as a result of activating the motor 16, the inflated tire-wheel assembly, TW, is rotated about the axis of rotation, A-A.

At step 112e, the rotational angular detector 18 sends a signal to the computer 14 for informing the computer 14 of the detected rotational amount, $\theta_{TW}$, that the inflated tire-wheel assembly, TW, has been rotated, R; upon receiving the signal from the rotational angular detector 18, the computer 14 determines if the inflated tire-wheel assembly, TW, has been rotated, R, about the axis of rotation, A-A, by the initialized angular amount, $\theta_{TW}=a°$. If the computer 14 determines that the inflated tire-wheel assembly, TW, has not been rotated, R, about the axis of rotation, A-A, by the initialized angular amount, $\theta_{TW}=a°$, the method 100e is looped from step 112e back to step 110e for continued rotation, R, of the inflated tire-wheel assembly, TW, about the axis of rotation, A-A. However, when the computer 14 receives a signal from the rotational angular detector 18 indicative of the rotational amount, $\theta_{TW}$, of the tire-wheel assembly, TW, being rotated, R, about the axis of rotation, A-A, to an amount that is equal to the initialized angular amount, $\theta_{TW}$, the method 100e is advanced from step 112e to step 114e.

At step 114e, the computer 14 actuates the plurality of imaging devices 12 for obtaining images of the tire, T, of the inflated tire-wheel assembly, TW. After obtaining images of the tire, T, of the inflated tire-wheel assembly, TW, as described above, the method 100e may be advanced to step 116e where the computer 14 increments the monitored initialize angular amount, $\theta_{TW}=a°$, of the tire-wheel assembly, TW, by an angular increment amount. In an example, the angular increment amount may be equal to a number in degrees (e.g., b°). In some implementations, the angular increment amount may be one degree (i.e., 1°). In some instances, the angular increment amount, b°, may be pre-programmed (or, alternatively, selectively programmed by a user).

At step 118e, an example of the methodology 100e employed by the computer 14 may determine if the incremented monitored rotational amount, $\theta_{TW}=\theta_{TW}+b°$, is greater than a maximum rotational amount, c°. In some implementations, the maximum rotational amount may be three-hundred-and-sixty degrees (i.e., 360°), which is equivalent to one full revolution of the tire-wheel assembly, TW. In other implementations, the maximum rotational amount may be seven-hundred-and-twenty degrees (i.e., 720°), which is equivalent to two full revolutions of the tire-wheel assembly, TW. In other implementations, the maximum rotational amount may be one-thousand-and-eighty degrees (i.e., 1080°), which is equivalent to three full revolutions of the tire-wheel assembly, TW. In some instances, the maximum rotational amount, c°, may be pre-programmed (or, alternatively, selectively programmed by a user).

At step 118e, if the computer 14 determines that the inflated tire-wheel assembly, TW, has not been rotated, R, about the axis of rotation, A-A, by an amount greater than the maximum rotational amount, c°, the method 100e is looped from step 118e back to step 110e for continued rotation, R, of the inflated tire-wheel assembly, TW, about the axis of rotation, A-A, and, where steps 112e-116e are repeated.

Referring to step 120e, the computer 14 utilizes the images of the tire, T, at one or more of each imaged instance of the tire, T (from e.g., $\theta_1$-$\theta_{1080}$, as described above), for calculating at least one cut section centroid measurement $75a_X$ (see, e.g., $\theta_1$, $75a_X$ of FIG. 5A$_X$), $75a_Y$ (see, e.g., $\theta_1$, $75a_Y$ of FIG. 5A$_Y$), $75b_X$ (see, e.g., $\theta_1$, $75b_X$ of FIG. 5B$_X$), $75b_Y$ (see, e.g., $\theta_1$, $75b_Y$ of FIG. 5B$_Y$) and $75b_Z$ (see, e.g., $\theta_1$, $75b_Z$ of FIG. 5B$_Z$) of the tire, T, based on the closed perimeter of the surfaces (e.g., the upper sidewall surface, $T_{SU}$, the lower sidewall surface, $T_{SL}$, the tread surface, $T_T$, or the like) of the tire, T, defined by the intersection of the offset plane, $P_1$, with the tire, T.

Although methods 100a, 100c, 100e for determining uniformity of a tire, T, of an inflated tire-wheel assembly, TW, has been described above that utilizes the two-dimensional analysis associated with the system of FIG. 2A, and, although methods 100b, 100d, 100e for determining at least one characteristic (e.g., uniformity) of a tire, T, of an inflated tire-wheel assembly, TW, has been described above that utilizes the three-dimensional analysis associated with the system of FIG. 2B, the system 10 is not limited to the methodologies 100a, 100b, 100c, 100d, 100e. In an example as seen in FIG. 6F, a method 100f for determining one or more characteristics (e.g., uniformity) of a tire, T, of an inflated tire-wheel assembly, TW, is shown that may utilize either the two-dimensional analysis associated with the system of FIG. 2A or the three-dimensional analysis associated with the system of FIG. 2B.

In a first step 102f, the inflated tire-wheel assembly, TW, is rotatably-fixed upon the axis of rotation, A-A. In an example, an axial support member (not shown) aligned with the axis of rotation, A-A, may be extended through a central opening of the wheel, W, for rotatably-fixing the inflated tire-wheel assembly, TW, upon the axis of rotation, A-A. In some implementations, the motor 16 may be a component of or connected to the axial support member.

Referring to step 104f, the plurality of imaging devices 12 may be selectively adjusted (i.e., configured/tuned/calibrated) by an operator of the system 10 such that the offset plane, $P_1$, traversing the plurality of imaging devices 12 are arranged at the distance, d, away from the reference plane, $P_2$. As explained above, in some implementations, the plurality of imaging devices 12 may be connected to a common carrier (not shown) in a pre-arranged manner; accordingly, upon adjustment of the common carrier at the distance, d, away from the from the reference plane, $P_2$, the arrangement of the plurality of imaging devices 12 within the offset plane, $P_1$, may be maintained. By selectively adjusting the he offset plane, $P_1$, at the distance, d, the intersection of the offset plane, $P_1$, defined by the plurality of imaging devices 12 with the tire, T, of the tire-wheel assembly, TW, may be selectively controlled by the operator.

Referring to steps 106f-114f, an example of the method 100f employed by the computer 14 may result in obtaining an image of the tire, T, from each imaging device $12_1$, $12_2$, $12_3$, $12_4$ of the plurality of imaging devices 12 on a predetermined basis. In an example, the predetermined basis employed by the method 100f and executed by the computer 14 may be pre-programmed (or, alternatively, selectively programmed by a user) to obtain an image from each imaging device $12_1$, $12_2$, $12_3$, $12_4$ of the plurality of imaging devices 12 at every instance that the inflated tire-wheel assembly, TW, is angularly rotated, R (e.g., $\theta_{TW}$), by an angular amount (see, e.g., a°, b°, as described below) as a result of the motor 16 rotating, R, the tire-wheel assembly, TW.

Referring to step 106f, the computer 14 may be initialized to monitor for rotation, R (according to the angle, $\theta_{TW}$), of the inflated tire-wheel assembly, TW, about the axis of rotation, A-A, at an angular amount. In an example, the initialized angular amount may be equal to a number in degrees (e.g., a°). In some implementations, the initialized angular amount may be one degree (i.e., 1°). In some instances, the initialized angular amount, a°, may be pre-programmed (or, alternatively, selectively programmed by a user).

Referring to step 108f, the computer 14 may activate the motor 16 for driving rotation, R, of the inflated tire-wheel assembly, TW, about the axis of rotation, A-A. At step 110f, as a result of activating the motor 16, the inflated tire-wheel assembly, TW, is rotated about the axis of rotation, A-A.

At step 112f, the rotational angular detector 18 sends a signal to the computer 14 for informing the computer 14 of the detected rotational amount, $\theta_{TW}$, that the inflated tire-wheel assembly, TW, has been rotated, R; upon receiving the signal from the rotational angular detector 18, the computer 14 determines if the inflated tire-wheel assembly, TW, has been rotated, R, about the axis of rotation, A-A, by the initialized angular amount, $\theta_{TW}$=a°. If the computer 14 determines that the inflated tire-wheel assembly, TW, has not been rotated, R, about the axis of rotation, A-A, by the initialized angular amount, $\theta_{TW}$=a°, the method 100f is looped from step 112f back to step 110f for continued rotation, R, of the inflated tire-wheel assembly, TW, about the axis of rotation, A-A. However, when the computer 14 receives a signal from the rotational angular detector 18 indicative of the rotational amount, $\theta_{TW}$, of the tire-wheel assembly, TW, being rotated, R, about the axis of rotation, A-A, to an amount that is equal to the initialized angular amount, $\theta_{TW}$, the method 100f is advanced from step 112f to step 114f.

At step 114f, the computer 14 actuates the plurality of imaging devices 12 for obtaining images of the tire, T, of the inflated tire-wheel assembly, TW. After obtaining images of the tire, T, of the inflated tire-wheel assembly, TW, as described above, the method 100f may be advanced to step 116f where the computer 14 increments the monitored initialize angular amount, $\theta_{TW}$=a°, of the tire-wheel assembly, TW, by an angular increment amount. In an example, the angular increment amount may be equal to a number in degrees (e.g., b°). In some implementations, the angular increment amount may be one degree (i.e., 1°). In some instances, the angular increment amount, b°, may be pre-programmed (or, alternatively, selectively programmed by a user).

At step 118f, an example of the methodology 100f employed by the computer 14 may determine if the incremented monitored rotational amount, $\theta_{TW}=\theta_{TW}+b°$, is greater than a maximum rotational amount, c°. In some implementations, the maximum rotational amount may be three-hundred-and-sixty degrees (i.e., 360°), which is equivalent to one full revolution of the tire-wheel assembly, TW. In other implementations, the maximum rotational amount may be seven-hundred-and-twenty degrees (i.e., 720°), which is equivalent to two full revolutions of the tire-wheel assembly, TW. In other implementations, the maximum rotational amount may be one-thousand-and-eighty degrees (i.e., 1080°), which is equivalent to three full revolutions of the tire-wheel assembly, TW. In some instances, the maximum rotational amount, c°, may be pre-programmed (or, alternatively, selectively programmed by a user).

At step 118f, if the computer 14 determines that the inflated tire-wheel assembly, TW, has not been rotated, R, about the axis of rotation, A-A, by an amount greater than the maximum rotational amount, c°, the method 100f is looped from step 118f back to step 110f for continued rotation, R, of the inflated tire-wheel assembly, TW, about the axis of rotation, A-A, and, where steps 112f-116f are repeated.

Referring to step 120f, the computer 14 utilizes the images of the tire, T, at one or more of each imaged instance of the tire, T (from e.g., $\theta_1$-$\theta_{1080}$, as described above), for calculating at least one of a cut section area measurement 50a (see, e.g., $\theta_1$, 50a of FIG. 4A), a cut section volume measurement 50b see, e.g., $\theta_1$, 50b of FIG. 4B) and a cut section centroid measurement $75a_X$ (see, e.g., $\theta_1$, $75a_X$ of FIG. $5A_X$), $75a_Y$ (see, e.g., $\theta_1$, $75a_Y$ of FIG. $5A_Y$), $75b_X$ (see, e.g., $\theta_1$, $75b_X$ of FIG. $5B_X$), $75b_Y$ (see, e.g., $\theta_1$, $75b_Y$ of FIG. $5B_Y$) and $75b_Z$ (see, e.g., $\theta_1$, $75b_Z$ of FIG. $5B_Z$) of the tire, T, based on the closed perimeter of the surfaces (e.g., the upper sidewall surface, $T_{SU}$, the lower sidewall surface, $T_{SL}$, the tread surface, $T_T$, or the like) of the tire, T, defined by the intersection of the offset plane, $P_1$, with the tire, T.

Then, at step 122f, the computer 14 may associate the one or more calculated area measurements 50a, the calculated volume measurements 50b, and the calculated centroid measurements $75a_X$, $75a_Y$, $75b_X$, $75b_Y$, $75b_Z$ into data set groups (see, e.g., 50a', 50a'', 50a''' in FIG. 4A; 50b', 50b'', 50b''' in FIG. 4B; $75a_X'$, $75a_X''$, $75a_X'''$ in FIG. $5A_X$, and $75a_Y'$, $75a_Y''$, $75a_Y'''$ in FIG. $5A_Y$; $75b_X'$, $75b_X''$, $75b_X'''$ in FIG. $5B_X$, $75b_Y'$, $75b_Y''$, $75b_Y'''$ in FIG. $5B_Y$ and $75b_Z'$, $75b_Z''$, $75b_Z'''$ in FIG. $5B_Z$). In some instances, each data set group (see, e.g., 50a', 50a'', 50a''' in FIG. 4A; 50b', 50b'', 50b''' in FIG. 4B; $75a_X'$, $75a_X''$, $75a_X'''$ in FIG. $5A_X$, and $75a_Y'$, $75a_Y''$, $75a_Y'''$ in FIG. $5A_Y$; $75b_X'$, $75b_X''$, $75b_X'''$ in FIG. $5B_X$, $75b_Y'$, $75b_Y''$, $75b_Y'''$ in FIG. $5B_Y$ and $75b_Z'$, $75b_Z''$, $75b_Z'''$ in FIG. $5B_Z$) may be associated with a complete revolution (e.g., $\theta_1$-$\theta_{360}$, $\theta_{361}$-$\theta_{720}$, $\theta_{721}$-$\theta_{1080}$, etc.) of the tire-wheel assembly, TW.

Then, at step 124f, the computer 14 may conduct a Fast Fourier Trans (FFT) for each data set group (see, e.g., 50a', 50a'', 50a''' in FIG. 4A; 50b', 50b'', 50b''' in FIG. 4B; $75a_X'$, $75a_X''$, $75a_X'''$ in FIG. $5A_X$, and $75a_Y'$, $75a_Y''$, $75a_Y'''$ in FIG. $5A_Y$; $75b_X'$, $75b_X''$, $75b_X'''$ in FIG. $5B_X$, $75b_Y'$, $75b_Y''$, $75b_Y'''$ in FIG. $5B_Y$ and $75b_Z'$, $75b_Z''$, $75b_Z'''$ in FIG. $5B_Z$) of the one or more data set groups (see, e.g., 50a', 50a'', 50a''' in FIG. 4A; 50b', 50b'', 50b''' in FIG. 4B; $75a_X'$, $75a_X''$, $75a_X'''$ in FIG. $5A_X$, and $75a_Y'$, $75a_Y''$, $75a_Y'''$ in FIG. $5A_Y$; $75b_X'$, $75b_X''$, $75b_X'''$ in FIG. $5B_X$, $75b_Y'$, $75b_Y''$, $75b_Y'''$ in FIG. $5B_Y$ and $75b_Z'$, $75b_Z''$, $75b_Z'''$ in FIG. $5B_Z$) in order to calculate first, second, and third harmonics relative to the rotation (e.g., $\theta_{TW}$=a° through $\theta_{TW}$=c°) of the tire-wheel assembly, TW. In view of the calculated harmonics, the computer 14 may algorithmically verify uniformity (or lack thereof) of the tire, T, without contacting the tire, T, with an apparatus, device or component (e.g., a roller) that directly engages and presses into or against the tire, T.

Although methods 100a, 100c, 100e, 100f for determining uniformity of a tire, T, of an inflated tire-wheel assembly, TW, has been described above that utilizes the two-dimensional analysis associated with the system of FIG. 2A, and, although methods 100b, 100d, 100e, 100f for determining at least one characteristic (e.g., uniformity) of a tire, T, of an inflated tire-wheel assembly, TW, has been described above that utilizes the three-dimensional analysis associated with the system of FIG. 2B, the system 10 is not limited to the methodologies 100a, 100b, 100c, 100d, 100e, 100f. In an example as seen in FIG. 6G, a method 100g for determining one or more characteristics (e.g., uniformity) of a tire, T, of an inflated tire-wheel assembly, TW, is shown that may utilize either the two-dimensional analysis associated with the system of FIG. 2A or the three-dimensional analysis associated with the system of FIG. 2B.

In a first step 102g, the inflated tire-wheel assembly, TW, is rotatably-fixed upon the axis of rotation, A-A. In an example, an axial support member (not shown) aligned with the axis of rotation, A-A, may be extended through a central opening of the wheel, W, for rotatably-fixing the inflated tire-wheel assembly, TW, upon the axis of rotation, A-A. In some implementations, the motor 16 may be a component of or connected to the axial support member.

Referring to step 104g, the plurality of imaging devices 12 may be selectively adjusted (i.e., configured/tuned/calibrated) by an operator of the system 10 such that the offset plane, $P_1$, traversing the plurality of imaging devices 12 are arranged at the distance, d, away from the reference plane, $P_2$. As explained above, in some implementations, the plurality of imaging devices 12 may be connected to a common carrier (not shown) in a pre-arranged manner; accordingly, upon adjustment of the common carrier at the distance, d, away from the from the reference plane, $P_2$, the arrangement of the plurality of imaging devices 12 within the offset plane, $P_1$, may be maintained. By selectively adjusting the he offset plane, $P_1$, at the distance, d, the intersection of the offset plane, $P_1$, defined by the plurality of imaging devices 12 with the tire, T, of the tire-wheel assembly, TW, may be selectively controlled by the operator.

Referring to steps 106g-114g, an example of the method 100g employed by the computer 14 may result in obtaining an image of the tire, T, from each imaging device $12_1$, $12_2$, $12_3$, $12_4$ of the plurality of imaging devices 12 on a predetermined basis. In an example, the predetermined basis employed by the method 100g and executed by the computer 14 may be pre-programmed (or, alternatively, selectively programmed by a user) to obtain an image from each imaging device $12_1$, $12_2$, $12_3$, $12_4$ of the plurality of imaging devices 12 at every instance that the inflated tire-wheel assembly, TW, is angularly rotated, R (e.g., $\theta_{TW}$), by an angular amount (see, e.g., a°, b°, as described below) as a result of the motor 16 rotating, R, the tire-wheel assembly, TW.

Referring to step 106g, the computer 14 may be initialized to monitor for rotation, R (according to the angle, $\theta_{TW}$), of the inflated tire-wheel assembly, TW, about the axis of rotation, A-A, at an angular amount. In an example, the initialized angular amount may be equal to a number in degrees (e.g., a°). In some implementations, the initialized angular amount may be one degree (i.e., 1°). In some instances, the initialized angular amount, a°, may be pre-programmed (or, alternatively, selectively programmed by a user).

Referring to step 108g, the computer 14 may activate the motor 16 for driving rotation, R, of the inflated tire-wheel assembly, TW, about the axis of rotation, A-A. At step 110g, as a result of activating the motor 16, the inflated tire-wheel assembly, TW, is rotated about the axis of rotation, A-A.

At step 112g, the rotational angular detector 18 sends a signal to the computer 14 for informing the computer 14 of the detected rotational amount, $\theta_{TW}$, that the inflated tire-wheel assembly, TW, has been rotated, R; upon receiving the signal from the rotational angular detector 18, the computer 14 determines if the inflated tire-wheel assembly, TW, has been rotated, R, about the axis of rotation, A-A, by the initialized angular amount, $\theta_{TW}$=a°. If the computer 14 determines that the inflated tire-wheel assembly, TW, has not been rotated, R, about the axis of rotation, A-A, by the initialized angular amount, $\theta_{TW}$=a°, the method 100g is looped from step 112g back to step 110g for continued rotation, R, of the inflated tire-wheel assembly, TW, about the axis of rotation, A-A. However, when the computer 14 receives a signal from the rotational angular detector 18 indicative of the rotational amount, $\theta_{TW}$, of the tire-wheel assembly, TW, being rotated, R, about the axis of rotation, A-A, to an amount that is equal to the initialized angular amount, $\theta_{TW}$, the method 100g is advanced from step 112g to step 114g.

At step 114g, the computer 14 actuates the plurality of imaging devices 12 for obtaining images of the tire, T, of the inflated tire-wheel assembly, TW. After obtaining images of the tire, T, of the inflated tire-wheel assembly, TW, as described above, the method 100g may be advanced to step 116g where the computer 14 increments the monitored initialize angular amount, $\theta_{TW}=a°$, of the tire-wheel assembly, TW, by an angular increment amount. In an example, the angular increment amount may be equal to a number in degrees (e.g., b°). In some implementations, the angular increment amount may be one degree (i.e., 1°). In some instances, the angular increment amount, b°, may be pre-programmed (or, alternatively, selectively programmed by a user).

At step 118g, an example of the methodology 100g employed by the computer 14 may determine if the incremented monitored rotational amount, $\theta_{TW}=\theta_{TW}+b°$, is greater than a maximum rotational amount, c°. In some implementations, the maximum rotational amount may be three-hundred-and-sixty degrees (i.e., 360°), which is equivalent to one full revolution of the tire-wheel assembly, TW. In other implementations, the maximum rotational amount may be seven-hundred-and-twenty degrees (i.e., 720°), which is equivalent to two full revolutions of the tire-wheel assembly, TW. In other implementations, the maximum rotational amount may be one-thousand-and-eighty degrees (i.e., 1080°), which is equivalent to three full revolutions of the tire-wheel assembly, TW. In some instances, the maximum rotational amount, c°, may be pre-programmed (or, alternatively, selectively programmed by a user).

At step 118g, if the computer 14 determines that the inflated tire-wheel assembly, TW, has not been rotated, R, about the axis of rotation, A-A, by an amount greater than the maximum rotational amount, c°, the method 100g is looped from step 118g back to step 110g for continued rotation, R, of the inflated tire-wheel assembly, TW, about the axis of rotation, A-A, and, where steps 112g-116g are repeated.

Referring to step 120g, the computer 14 utilizes the images of the tire, T, at one or more of each imaged instance of the tire, T (from e.g., $\theta_1$-$\theta_{1080}$, as described above), for calculating at least one of a cut section area measurement 50a (see, e.g., $\theta_1$, 50a of FIG. 4A), a cut section volume measurement 50b see, e.g., $\theta_1$, 50b of FIG. 4B) and a cut section centroid measurement 75a$_X$ (see, e.g., $\theta_1$, 75a$_X$ of FIG. 5A$_X$), 75a$_Y$ (see, e.g., $\theta_1$, 75a$_Y$ of FIG. 5A$_Y$), 75b$_X$ (see, e.g., $\theta_1$, 75b$_X$ of FIG. 5B$_X$), 75b$_Y$ (see, e.g., $\theta_1$, 75b$_Y$ of FIG. 5B$_Y$) and 75b$_Z$ (see, e.g., $\theta_1$, 75b$_Z$ of FIG. 5B$_Z$) of the tire, T, based on the closed perimeter of the surfaces (e.g., the upper sidewall surface, $T_{SU}$, the lower sidewall surface, $T_{SL}$, the tread surface, $T_T$, or the like) of the tire, T, defined by the intersection of the offset plane, $P_1$, with the tire, T.

Then, at step 122g, the computer 14 may conduct mathematical operations on any/all of the area measurements (see, e.g., $\theta_1$-$\theta_{1080}$, 50a of FIG. 4A), the volume measurements (see, e.g., $\theta_1$-$\theta_{1080}$, 50b of FIG. 4B), the X component centroid area measurements (see, e.g., $\theta_1$-$\theta_{1080}$, 75a$_X$ of FIG. 5A$_X$), the Y component centroid area measurements (see, e.g., $\theta_1$-$\theta_{1080}$, 75a$_Y$ of FIG. 5A$_Y$), the X component centroid volume measurements (see, e.g., $\theta_1$-$\theta_{1080}$, 75b$_X$ of FIG. 5B$_X$), the Y component centroid volume measurements (see, e.g., $\theta_1$-$\theta_{1080}$, 75b$_Y$ of FIG. 5B$_Y$) and the Z component centroid volume measurements (see, e.g., $\theta_1$-$\theta_{1080}$, 75b$_Z$ of FIG. 5B$_Z$) during the rotation (e.g., $\theta_{TW}=a°$ through $\theta_{TW}=c°$) of the tire-wheel assembly, TW, to create a road force variation number based on correlation/analysis. In view of the determined road force variation number, the computer 14 may algorithmically verify uniformity (or lack thereof) of the tire, T, without contacting the tire, T, with an apparatus, device or component (e.g., a roller) that directly engages and presses into or against the tire, T.

The system described above may be able to make three dimensional calculations based on the volume of the solid formed by the surface of the tire outboard of the section plane. In some implementations, the calculation includes volume (cm³) of a virtual solid piece. In some implementations, the calculation includes a centroid (mm) of the virtual solid piece in spatial (e.g., x, y, z) coordinates. In some examples the system performs overlapped calculations of parameters as the tire-wheel assembly, TW, is rotated through at least one full revolution. In some instances, the system may run each of the individual number sets through Fast Fourier Trans (FFT) to calculate first, second and third harmonics (magnitude and phase) relative to the rotation of the assembly. In some examples, the system is capable of performing mathematical operations on any/all of the calculated parameters in order to create an effective road force variation number based on correlation/analysis.

In addition, the system described above may be able to make two dimensional calculations based on the area of the surface formed by the section plane. In some implementations, the calculation includes area (cm²) of a virtual flat piece. In some implementations, the calculation includes a centroid (mm) of the virtual flat piece in planar (e.g., x, y) coordinates. In some examples the system performs overlapped calculations of parameters as the tire-wheel assembly, TW, is rotated through at least one full revolution. In some instances, the system may run each of the individual number sets through Fast Fourier Trans (FFT) to calculate first, second and third harmonics (magnitude and phase) relative to the rotation of the assembly. In some examples, the system is capable of performing mathematical operations on any/all of the calculated parameters in order to create an effective road force variation number based on correlation/analysis.

Various implementations of the computer 14 included with the system 10 and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A system for determining road force uniformity of a tire including the tire mounted to a wheel and the tire being in an inflated state such that pressurized air is deposited into a circumferential air cavity of the tire which causes an upper bead and a lower bead of the tire to be respectively disposed adjacent and seat in an upper bead seat and a lower bead seat of the wheel, comprising:
   a plurality of imaging devices that images a plurality of surfaces of the tire as the tire-wheel assembly is rotated about an axis of rotation;
   a computer communicatively-coupled to the plurality of imaging devices, wherein the computer receives images captured by the plurality of imaging devices in order for the computer to extract data from the images such that the computer may execute a road force uniformity simulation algorithm for the purpose of algorithmically simulating road force uniformity of the tire, wherein the plurality of imaging devices are aligned with
   an offset plane, wherein the offset plane is arranged at a distance from
   a reference plane, wherein the reference plane traverses the axis of rotation and is parallel to a tangent line extending across the tread surface of the tire, wherein the computer utilizes the data for algorithmically creating
   at least one virtual cut section through the tire along the offset plane, wherein the computer algorithmically identifies uniformity or lack thereof of the tire by conducting
   at least one two-dimensional calculation gleaned from at least one topographical image of the plurality of surfaces of the tire from each imaging device of the plurality of imaging devices that are derived from an X-component and a Y-component of each virtual cut section through the tire of the plurality of virtual cut sections through the tire, wherein the at least one two-dimensional calculation includes
   at least one X-component centroid area measurement of the tire, and
   at least one Y-component centroid area measurement of the tire, wherein the at least one X-component centroid area measurement of the tire includes
   a plurality of X-component centroid area measurements of the tire, wherein the at least one Y-component centroid area measurement of the tire includes
   a plurality of Y-component centroid area measurements of the tire, wherein each X-component centroid area measurement of the tire of the plurality of X-component centroid area measurements of the tire is paired with an angular orientation of the tire over at least one full revolution of the tire-wheel assembly in order for the computer to compile
      at least one set of X-component centroid area measurements of the tire wherein each Y-component centroid area measurement of the tire of the plurality of Y-component centroid area measurements of the tire is paired with the angular orientation of the tire over at least one full revolution of the tire-wheel assembly in order for the computer to compile
      at least one set of Y-component centroid area measurement of the tire.

2. The system according to claim 1, further comprising:
a tire-wheel assembly rotational angular detector, wherein the tire-wheel assembly rotational angular detector is communicatively-coupled to the computer, wherein the computer monitors an angular orientation of the tire of the tire-wheel assembly about the axis of rotation, wherein the computer pairs the angular orientation of the tire with the images of the plurality of surfaces of the tire in order for the computer to identify uniformity or lack thereof of the tire occurring at one or more specific angular orientations of the tire as the tire is rotated about the axis of rotation.

3. The system according to claim 1, further comprising:
a motor connected to the tire-wheel assembly, wherein the motor is communicatively-coupled to the computer, wherein the computer controls the motor for controlling speed of rotation of the tire-wheel assembly about the axis of rotation.

4. The system according to claim 1, wherein the plurality of surfaces of the tire that are imaged by the plurality of imaging devices includes:
   an upper sidewall surface of the tire,
   a lower sidewall surface of the tire,
   a leading portion of the tread surface of the tire, and
   a trailing portion of the tread surface of the tire.

5. The system according to claim 4, wherein the plurality of imaging devices includes:
   a first imaging device that images the upper sidewall surface of the tire,
   a second imaging device that images the lower sidewall surface of the tire,
   a third imaging device that images the leading portion of the tread surface of the tire, and
   a fourth imaging device that images the trailing portion of the tread surface of the tire.

6. The system according to claim 4, wherein the plurality of imaging devices includes:

a camera that images the plurality of surfaces of the tire; and an illuminator that directs light toward the plurality of surfaces of the tire.

7. The system according to claim 6, wherein the illuminator is a laser.

8. A system for determining road force uniformity of a tire including the tire mounted to a wheel and the tire being in an inflated state such that pressurized air is deposited into a circumferential air cavity of the tire which causes an upper bead and a lower bead of the tire to be respectively disposed adjacent and seat in an upper bead seat and a lower bead seat of the wheel, comprising:
  a plurality of imaging devices that images a plurality of surfaces of the tire as the tire-wheel assembly is rotated about an axis of rotation;
  a computer communicatively-coupled to the plurality of imaging devices, wherein the computer receives images captured by the plurality of imaging devices in order for the computer to extract data from the images such that the computer may execute a road force uniformity simulation algorithm for the purpose of algorithmically simulating road force uniformity of the tire, wherein the plurality of imaging devices are aligned with
  an offset plane, wherein the offset plane is arranged at a distance from
  a reference plane, wherein the reference plane traverses the axis of rotation and is parallel to a tangent line extending across the tread surface of the tire, wherein the computer utilizes the data for algorithmically creating
  at least one virtual cut section through the tire along the offset plane, wherein the computer algorithmically identifies uniformity or lack thereof of the tire by conducting
  at least one three-dimensional calculation gleaned from at least one topographical image of the plurality of surfaces of the tire from each imaging device of the plurality of imaging devices that are derived from an X-component, a Y-component and a Z-component of each virtual cut section through the tire of the plurality of virtual cut sections through the tire, wherein the at least one three-dimensional calculation includes:
  at least one X-component centroid volume measurement of the tire,
  at least one Y-component centroid volume measurement of the tire, and
  at least one Z-component centroid volume measurement of the tire, wherein the at least one X-component centroid volume measurement of the tire includes
  a plurality of X-component centroid volume measurements of the tire, wherein each X-component centroid volume measurement of the tire of the plurality of X-component centroid volume measurements of the tire is paired with an angular orientation of the tire over at least one full revolution of the tire-wheel assembly in order for the computer to compile
    at least one set of X-component centroid volume measurements of the tire, wherein the at least one Y-component centroid volume measurement of the tire includes
  a plurality of Y-component centroid volume measurements of the tire, wherein each Y-component centroid volume measurement of the tire of the plurality of Y-component centroid volume measurements of the tire is paired with an angular orientation of the tire over at least one full revolution of the tire-wheel assembly in order for the computer to compile
    at least one set of Y-component centroid volume measurement of the tire, wherein the at least one Z-component centroid volume measurement of the tire includes
  a plurality of Z-component centroid volume measurements of the tire, wherein each Z-component centroid volume measurement of the tire of the plurality of Z-component centroid volume measurements of the tire is paired with an angular orientation of the tire over at least one full revolution of the tire-wheel assembly in order for the computer to compile
    at least one set of Z-component centroid volume measurement of the tire.

9. A method for analyzing a tire-wheel assembly including a tire mounted to a wheel with the tire being in an inflated state such that pressurized air is deposited into a circumferential air cavity of the tire which causes an upper bead and a lower bead of the tire to be respectively disposed adjacent and seat in an upper bead seat and a lower bead seat of the wheel, comprising:
  utilizing a system for determining road force uniformity of a tire, wherein the system includes a plurality of imaging devices that are communicatively-coupled to a computer;
  rotating the tire-wheel assembly about an axis of rotation;
  utilizing the plurality of imaging devices for imaging a plurality of surfaces of the tire as the tire-wheel assembly is rotated about an axis of rotation;
  utilizing the computer for
    receiving images captured by the plurality of imaging devices in order for the computer, and
    extracting data from the images for
      executing a road force uniformity simulation algorithm for
        algorithmically simulating road force uniformity of the tire, wherein the method includes the step of:
  aligning the plurality of imaging devices with an offset plane, wherein the offset plane is arranged at a distance from a reference plane, wherein the reference plane traverses the axis of rotation and is parallel to a tangent line extending across the tread surface of the tire, wherein the method includes the step of:
  utilizing the data for algorithmically creating at least one virtual cut section through the tire along the offset plane, wherein the method includes the step of:
  utilizing the computer for algorithmically identifying uniformity or lack thereof of the tire by
    conducting at least one two-dimensional calculation gleaned from at least one topographical image of the plurality of surfaces of the tire from each imaging device of the plurality of imaging devices that are derived from an X-component and a Y-component of each virtual cut section through the tire of the plurality of virtual cut sections through the tire, wherein the at least one two-dimensional calculation includes at least one X-component centroid area measurement of the tire and at least one Y-component centroid area measurement of the tire, wherein the at least one X-component centroid area measurement of the tire includes a plurality of X-component centroid area measurements of the tire, wherein the at least one Y-component centroid area measurement of the tire includes a plurality of Y-component centroid area measurements of the tire, wherein the method includes the steps of:

utilizing the computer for pairing each X-component centroid area measurement of the tire of the plurality of X-component centroid area measurements of the tire with an angular orientation of the tire over at least one full revolution of the tire-wheel assembly for compiling at least one set of X-component centroid area measurements of the tire, utilizing the computer for pairing each Y-component centroid area measurement of the tire of the plurality of Y-component centroid area measurements of the tire with the angular orientation of the tire over at least one full revolution of the tire-wheel assembly for compiling at least one set of Y-component centroid area measurement of the tire.

10. The method according to claim 9, wherein the system includes a tire-wheel assembly rotational angular detector that is communicatively-coupled to the computer, wherein the method further includes the step of:

utilizing the assembly rotational angular detector for sending a signal to the computer that is related to angular orientation of the tire arising from the step of rotating the tire-wheel assembly about an axis of rotation;

receiving the signal at the computer for monitoring the angular orientation of the tire.

11. The method according to claim 9, wherein the method further includes the step of:

utilizing the computer for pairing the angular orientation of the tire with captured images of the plurality of surfaces of the tire for permitting the computer to algorithmically identify uniformity or lack thereof of the tire occurring at one or more specific angular orientations of the tire as the tire is rotated about the axis of rotation.

12. The method according to claim 9, wherein the system includes a motor connected to the tire-wheel assembly, wherein the motor is communicatively-coupled to the computer, wherein the method further includes the step of:

utilizing the computer for sending a signal to the motor for controlling speed of the rotation of the tire-wheel assembly about the axis of rotation.

13. The method according to claim 9, wherein the plurality of surfaces of the tire that are imaged by the plurality of imaging devices includes:

an upper sidewall surface of the tire,
a lower sidewall surface of the tire,
a leading portion of the tread surface of the tire, and
a trailing portion of the tread surface of the tire.

14. The method according to claim 13, wherein the plurality of imaging devices includes:

a first imaging device for imaging the upper sidewall surface of the tire,
a second imaging device for imaging the lower sidewall surface of the tire,
a third imaging device for imaging the leading portion of the tread surface of the tire, and
a fourth imaging device for imaging the trailing portion of the tread surface of the tire.

15. The method according to claim 13, wherein the plurality of imaging devices includes:

a camera for imaging the plurality of surfaces of the tire; and
an illuminator for directing light toward the plurality of surfaces of the tire.

16. The method according to claim 15, wherein the illuminator is a laser.

17. A method for analyzing a tire-wheel assembly including a tire mounted to a wheel with the tire being in an inflated state such that pressurized air is deposited into a circumferential air cavity of the tire which causes an upper bead and a lower bead of the tire to be respectively disposed adjacent and seat in an upper bead seat and a lower bead seat of the wheel, comprising:

utilizing a system for determining road force uniformity of a tire, wherein the system includes a plurality of imaging devices that are communicatively-coupled to a computer;
rotating the tire-wheel assembly about an axis of rotation;
utilizing the plurality of imaging devices for imaging a plurality of surfaces of the tire as the tire-wheel assembly is rotated about an axis of rotation;
utilizing the computer for
receiving images captured by the plurality of imaging devices in order for the computer, and
extracting data from the images for
executing a road force uniformity simulation algorithm for algorithmically simulating road force uniformity of the tire,
wherein the method includes the step of:
aligning the plurality of imaging devices with an offset plane, wherein the offset plane is arranged at a distance from a reference plane, wherein the reference plane traverses the axis of rotation and is parallel to a tangent line extending across the tread surface of the tire, wherein the method includes the step of:
utilizing the data for algorithmically creating at least one virtual cut section through the tire along the offset plane, wherein the method includes the step of:
utilizing the computer for algorithmically identifying uniformity or lack thereof of the tire by
conducting at least one three-dimensional calculation gleaned from at least one topographical image of the plurality of surfaces of the tire from each imaging device of the plurality of imaging devices that are derived from an X-component, a Y-component and a Z-component of each virtual cut section through the tire of the plurality of virtual cut sections through the tire, wherein the at least one three-dimensional calculation includes at least one X-component centroid volume measurement of the tire, at least one Y-component centroid volume measurement of the tire, and at least one Z-component centroid volume measurement of the tire, wherein the at least one X-component centroid volume measurement of the tire includes a plurality of X-component centroid volume measurements of the tire, wherein the at least one Y-component centroid volume measurement of the tire includes a plurality of Y-component centroid volume measurements of the tire, wherein the at least one Z-component centroid volume measurement of the tire includes a plurality of Z-component centroid volume measurements of the tire, wherein the method includes the steps of:
utilizing the computer for pairing each X-component centroid volume measurement of the tire of the plurality of X-component centroid volume measurements of the tire with an angular orientation of the tire over at least one full revolution of the tire-wheel assembly for compiling at least one set of X-component centroid volume measurements of the tire;

utilizing the computer for pairing each Y-component centroid volume measurement of the tire of the plurality of Y-component centroid volume measurements of the tire with an angular orientation of the tire over at least one full revolution of the tire-wheel assembly for compiling at least one set of Y-component centroid volume measurement of the tire, utilizing the computer for pairing each Z-component centroid volume measurement of the tire of the plurality of Z-component centroid volume measurements of the tire with an angular orientation of the tire over at least one full revolution of the tire-wheel assembly for compiling at least one set of Z-component centroid volume measurement of the tire.

\* \* \* \* \*

UNITED STATES PATENT AND TRADEMARK OFFICE
CERTIFICATE OF CORRECTION

PATENT NO. : 9,618,425 B2
APPLICATION NO. : 14/080146
DATED : April 11, 2017
INVENTOR(S) : Barry Allan Clark et al.

It is certified that error appears in the above-identified patent and that said Letters Patent is hereby corrected as shown below:

In the Specification

Figure 6H:
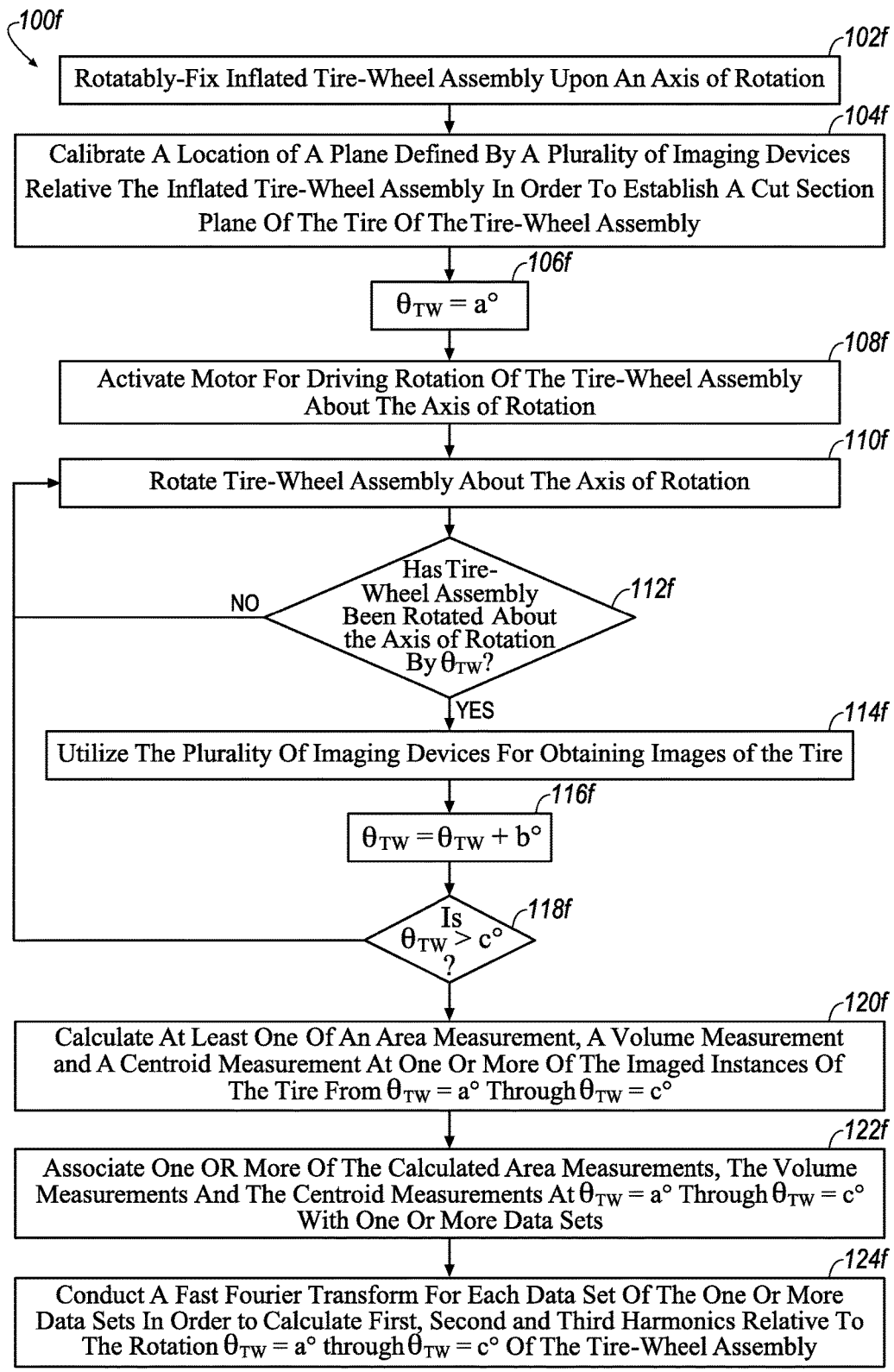
Figure 6I:
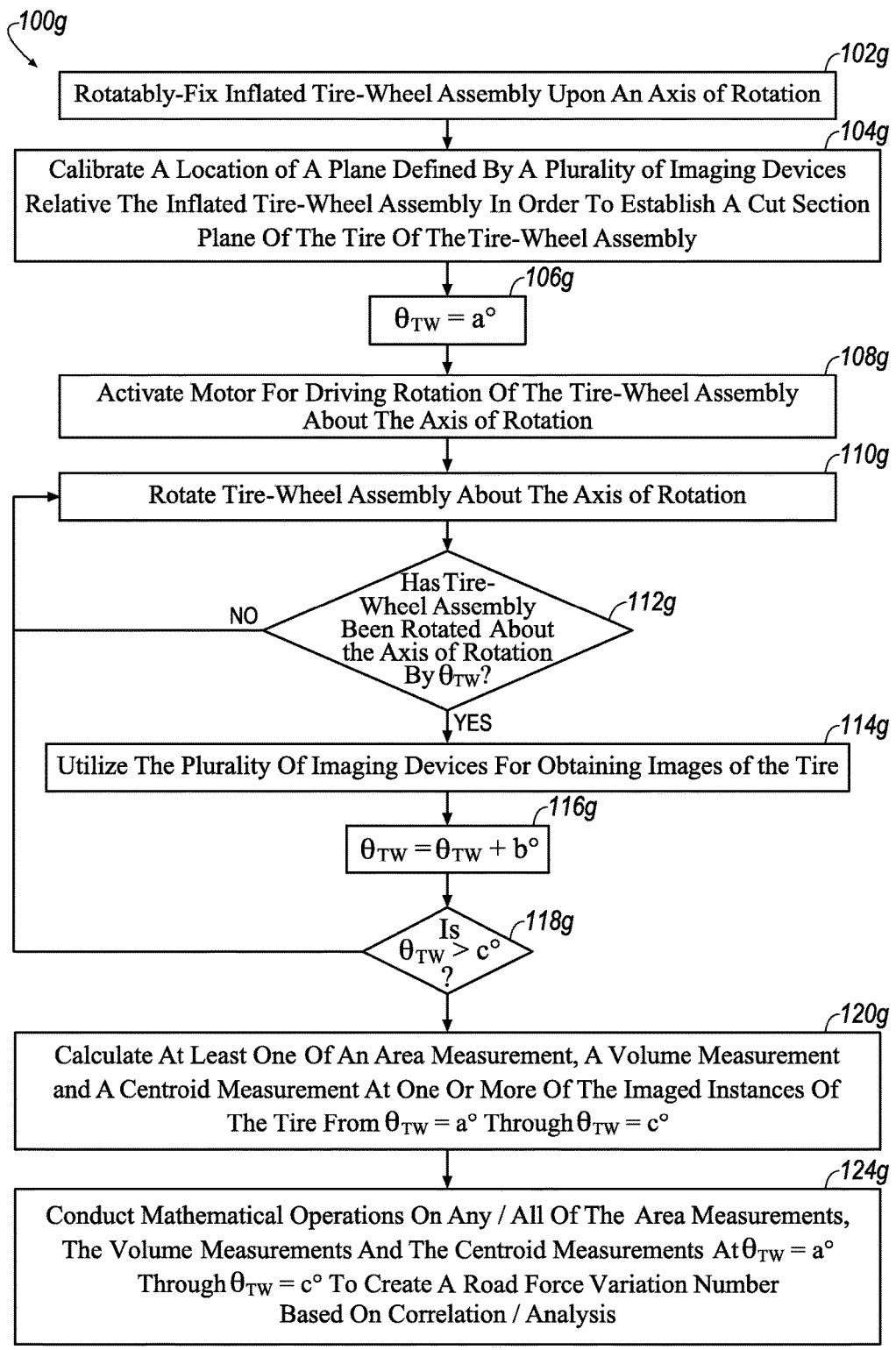

At Column 1, Line 65, delete "FIG. 6A" and insert --FIGS. 6A-6B--;

At Column 2, Line 1, delete "FIG. 6B" and insert --FIGS. 6C-6D--;

At Column 2, Line 4, delete "FIG. 6C" and insert --FIG. 6E--;

At Column 2, Line 7, delete "FIG. 6D" and insert --FIG. 6F--;

At Column 2, Line 10, delete "FIG. 6E" and insert --FIG. 6G--;

At Column 2, Line 14, delete "FIG. 6F" and insert --FIG. 6H--;

At Column 2, Line 19, delete "FIG. 6G" and insert --FIG. 6I--;

At Column 14, Line 40, delete "2A-6A," and insert --2A-6A, 6B,--;

At Column 14, Line 46, delete "2B-6B" and insert --2B-6C, 6D,--;

At Column 16, Line 4, delete "FIG. 6A," and insert --FIGS. 6A-6B,--;

At Column 16, Line 7, delete "FIG. 6A" and insert --FIGS. 6A-6B--;

At Column 20, Line 9, delete "FIG. 6B," and insert --FIGS. 6C-6D,--;

At Column 20, Line 12, delete "FIG. 6B" and insert --FIGS. 6C-6D,--;

At Column 23, Line 10, delete "6C," and insert --6E,--;

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,618,425 B2

At Column 25, Line 12, delete "FIG. 6D," and insert --FIG. 6F,--;

At Column 27, Line 13, delete "FIG. 6E," and insert --FIG. 6G,--;

At Column 29, Line 20, delete "FIG. 6F," and insert --FIG. 6H,--;

At Column 31, Line 62, delete "FIG. 6G," and insert --FIG. 6I,--.